(12) United States Patent
Wang et al.

(10) Patent No.: US 11,368,087 B1
(45) Date of Patent: Jun. 21, 2022

(54) BIDIRECTIONAL DC/DC CONVERTER AND ENERGY STORAGE SYSTEM

(71) Applicant: ECOFLOW INC., Shenzhen (CN)

(72) Inventors: Lei Wang, Shenzhen (CN); Xi Chen, Shenzhen (CN)

(73) Assignee: ECOFLOW INC., Shenzhen (CN)

( * ) Notice: Subject to any disclaimer, the term of this patent is extended or adjusted under 35 U.S.C. 154(b) by 0 days.

(21) Appl. No.: 17/521,294

(22) Filed: Nov. 8, 2021

Related U.S. Application Data

(63) Continuation of application No. PCT/CN2021/110804, filed on Aug. 5, 2021.

(30) Foreign Application Priority Data

Feb. 3, 2021 (CN) .......................... 202110146268.6

(51) Int. Cl.
*H02M 3/158* (2006.01)
*H02J 7/00* (2006.01)

(52) U.S. Cl.
CPC ........... *H02M 3/158* (2013.01); *H02J 7/0068* (2013.01); *H02J 2207/20* (2020.01)

(58) Field of Classification Search
CPC ..... H02M 3/158; H02J 7/0068; H02J 2207/20
USPC ................ 320/128, 140, 145, 162, 163, 129
See application file for complete search history.

(56) References Cited

U.S. PATENT DOCUMENTS

| 9,065,349 | B2* | 6/2015 | Chiang | H02M 3/33584 |
| 10,476,283 | B2* | 11/2019 | Leung | H02J 7/00 |
| 2017/0012452 | A1* | 1/2017 | Kang | H02J 7/02 |
| 2018/0090944 | A1* | 3/2018 | Reddiconto | G05F 1/575 |

FOREIGN PATENT DOCUMENTS

| CN | 103326566 A | 9/2013 |
| CN | 106712511 A | 5/2017 |
| CN | 107465343 A | 12/2017 |
| CN | 107607770 A | 1/2018 |
| CN | 110768528 A | 2/2020 |
| CN | 111049378 A | 4/2020 |
| CN | 112511005 A | 3/2021 |

\* cited by examiner

*Primary Examiner* — Richard V Muralidar
(74) *Attorney, Agent, or Firm* — Anova Law Group, PLLC

(57) ABSTRACT

A bidirectional DC/DC converter and an energy storage system are provided. The bidirectional DC/DC converter includes: a first half-bridge circuit, a second half-bridge circuit, an inductor circuit, an inductor current detection circuit, and a control circuit. The control circuit is configured to: according to an operating mode, determine one of the first and second half-bridge circuits as a target half-bridge circuit; determine a target switch circuit and a freewheeling switch circuit; control the target switch circuit to be turned on and off periodically; control the freewheeling switch circuit to be turned off when the target switch circuit is turned on; control the freewheeling switch circuit to be turned on when the target switch circuit is turned off; and when an amplitude of a current flowing through the inductor circuit is less than or equal to a preset threshold value, control the freewheeling switch circuit to be turned off.

20 Claims, 13 Drawing Sheets

# BIDIRECTIONAL DC/DC CONVERTER AND ENERGY STORAGE SYSTEM

CROSS-REFERENCE TO RELATED APPLICATION

This application is a continuation application of PCT Patent Application No. PCT/CN2021/110804, filed on Aug. 5, 2021, which claims priority to Chinese patent application No. 202110146268.6, filed with the Chinese National Intellectual Property Administration on Feb. 3, 2021, and entitled "BIDIRECTIONAL DC/DC CONVERTER AND ENERGY STORAGE SYSTEM", the entirety of which is incorporated herein by reference.

FIELD

The present disclosure generally relates to the field of voltage conversion technology and, more particularly, relates to a bidirectional DC/DC converter and an energy storage system.

BACKGROUND

A direct current/direct current (DC/DC) converter is capable of achieving voltage conversion that can be used in charge and discharge of the lithium-ion battery. Specifically, when the lithium-ion battery is charging or discharging, the DC/DC converter can form a buck circuit or a boost circuit inside, to achieve voltage conversion. However, existing DC/DC converters have a problem of poor reliability during operation.

SUMMARY

One aspect of the present disclosure provides a bidirectional DC/DC converter. The converter includes a first half-bridge circuit including two switch circuits connected in series and configured to be connected to a first power port, and a second half-bridge circuit including two switch circuits connected in series and configured to be connected to a second power port. The first power port is configured to be connected to a direct current bus, and the second power port is configured to be connected to an energy storage device. The converter also includes an inductor circuit, where one end of the inductor circuit is connected to a connection point of the two switch circuits in the first half-bridge circuit, another end of the inductor circuit is connected to a connection point of the two switch circuits in the second half-bridge circuit. The first half-bridge circuit and the second half-bridge circuit form a H-bridge loop through the inductor circuit. Moreover, the converter includes an inductor current detection circuit configured to collect an amplitude of a current flowing through the inductor circuit. Further, the converter includes a control circuit connected to the two switch circuits in the first half-bridge circuit, the two switch circuits in the second half-bridge circuit, and the inductor current detection circuit, respectively. The control circuit is configured to determine an operating mode of the bidirectional DC/DC converter. The control circuit is also configured to according to the operating mode, determine one of the first and second half-bridge circuits as a target half-bridge circuit, and determine one of the two switch circuits in the target half-bridge circuit as a target switch circuit, and another one of the two switch circuits in the target half-bridge circuit as a freewheeling switch circuit. Moreover, the control circuit is configured to control the target switch circuit to be turned on and off periodically. In addition, the control circuit is configured to control the freewheeling switch circuit to be turned off when the target switch circuit is turned on, and control the freewheeling switch circuit to be turned on when the target switch circuit is turned off. Further, the control circuit is configured to when the amplitude of the current flowing through the inductor circuit is less than or equal to a preset threshold value, determine that energy stored in the inductor circuit is fully released, and control the freewheeling switch circuit to be turned off.

Another aspect of the present disclosure provides a bidirectional DC/DC converter. The converter includes a first half-bridge circuit including two switch circuits connected in series and configured to be connected to a first power port, and a second half-bridge circuit including two switch circuits connected in series and configured to be connected to a second power port. The first power port is configured to be connected to a direct current bus, and the second power port is configured to be connected to an energy storage device. Each switch circuit includes one switch transistor or a plurality of switch transistors connected in parallel. The converter also includes an inductor circuit, where one end of the inductor circuit is connected to a connection point of the two switch circuits in the first half-bridge circuit, and another end of the inductor circuit is connected to a connection point of the two switch circuits in the second half-bridge circuit. The first half-bridge circuit and the second half-bridge circuit form a H-bridge loop through the inductor circuit. In addition, the converter includes an inductor current detection circuit configured to collect an amplitude of a current flowing through the inductor circuit. Further, the converter includes a control circuit connected to the two switch circuits in the first half-bridge circuit, the two switch circuits in the second half-bridge circuit, and the inductor current detection circuit, respectively. The control circuit is configured to determine an operating mode of the bidirectional DC/DC converter. The control circuit is also configured to according to the operating mode, determine one of the first and second half-bridge circuits as a target half-bridge circuit, and determine one of the two switch circuits in the target half-bridge circuit as a target switch circuit, and another one of the two switch circuits in the target half-bridge circuit as a freewheeling switch circuit. Moreover, the control circuit is configured to control the target switch circuit to be turned on and off periodically, control the freewheeling switch circuit to be turned off when the target switch circuit is turned on, and control the freewheeling switch circuit to be turned on when the target switch circuit is turned off. In addition, the control circuit is configured to when the amplitude of the current flowing through the inductor circuit is less than or equal to a preset threshold value, determine that energy stored in the inductor circuit is fully released, and control the freewheeling switch circuit to be turned off. Further, the control circuit is configured to determine a duty cycle of the target switch circuit according to a switch control parameter. The switch control parameter includes a current deviation control parameter, the switch control parameter varies with the current deviation control parameter, and the current deviation control parameter corresponds to a difference between a preset current value in the operating mode and the amplitude of the current flowing through the inductor circuit. Furthermore, the control circuit is configured to correct the current deviation control parameter according to a compensation current value to improve control accuracy. The compensation current value is a difference value between the preset current value and an average value of current flowing through the second power port.

Another aspect of the present disclosure provides an energy storage system. The energy storage system includes a bidirectional DC/DC converter, and an energy storage device connected to a second power port of the bidirectional DC/DC converter. The bidirectional DC/DC converter includes a first half-bridge circuit including two switch circuits connected in series and configured to be connected to a first power port, and a second half-bridge circuit including two switch circuits connected in series and configured to be connected to a second power port. The first power port is configured to be connected to a direct current bus, and the second power port is configured to be connected to an energy storage device. The converter also includes an inductor circuit, where one end of the inductor circuit is connected to a connection point of the two switch circuits in the first half-bridge circuit, another end of the inductor circuit is connected to a connection point of the two switch circuits in the second half-bridge circuit. The first half-bridge circuit and the second half-bridge circuit form a H-bridge loop through the inductor circuit. Moreover, the converter includes an inductor current detection circuit configured to collect an amplitude of a current flowing through the inductor circuit. Further, the converter includes a control circuit connected to the two switch circuits in the first half-bridge circuit, the two switch circuits in the second half-bridge circuit, and the inductor current detection circuit, respectively. The control circuit is configured to determine an operating mode of the bidirectional DC/DC converter. The control circuit is also configured to according to the operating mode, determine one of the first and second half-bridge circuits as a target half-bridge circuit, and determine one of the two switch circuits in the target half-bridge circuit as a target switch circuit, and another one of the two switch circuits in the target half-bridge circuit as a freewheeling switch circuit. Moreover, the control circuit is configured to control the target switch circuit to be turned on and off periodically. In addition, the control circuit is configured to control the freewheeling switch circuit to be turned off when the target switch circuit is turned on, and control the freewheeling switch circuit to be turned on when the target switch circuit is turned off. Further, the control circuit is configured to when the amplitude of the current flowing through the inductor circuit is less than or equal to a preset threshold value, determine that energy stored in the inductor circuit is fully released, and control the freewheeling switch circuit to be turned off.

Another aspect of the present disclosure provides an energy storage system. The energy storage system includes a bidirectional DC/DC converter, and an energy storage device connected to a second power port of the bidirectional DC/DC converter. The bidirectional DC/DC converter includes a first half-bridge circuit including two switch circuits connected in series and configured to be connected to a first power port, and a second half-bridge circuit including two switch circuits connected in series and configured to be connected to a second power port. The first power port is configured to be connected to a direct current bus, and the second power port is configured to be connected to an energy storage device. Each switch circuit includes one switch transistor or a plurality of switch transistors connected in parallel. The converter also includes an inductor circuit, where one end of the inductor circuit is connected to a connection point of the two switch circuits in the first half-bridge circuit, and another end of the inductor circuit is connected to a connection point of the two switch circuits in the second half-bridge circuit. The first half-bridge circuit and the second half-bridge circuit form a H-bridge loop through the inductor circuit. In addition, the converter includes an inductor current detection circuit configured to collect an amplitude of a current flowing through the inductor circuit. Further, the converter includes a control circuit connected to the two switch circuits in the first half-bridge circuit, the two switch circuits in the second half-bridge circuit, and the inductor current detection circuit, respectively. The control circuit is configured to determine an operating mode of the bidirectional DC/DC converter. The control circuit is also configured to according to the operating mode, determine one of the first and second half-bridge circuits as a target half-bridge circuit, and determine one of the two switch circuits in the target half-bridge circuit as a target switch circuit, and another one of the two switch circuits in the target half-bridge circuit as a freewheeling switch circuit. Moreover, the control circuit is configured to control the target switch circuit to be turned on and off periodically, control the freewheeling switch circuit to be turned off when the target switch circuit is turned on, and control the freewheeling switch circuit to be turned on when the target switch circuit is turned off. In addition, the control circuit is configured to when the amplitude of the current flowing through the inductor circuit is less than or equal to a preset threshold value, determine that energy stored in the inductor circuit is fully released, and control the freewheeling switch circuit to be turned off. Further, the control circuit is configured to determine a duty cycle of the target switch circuit according to a switch control parameter. The switch control parameter includes a current deviation control parameter, the switch control parameter varies with the current deviation control parameter, and the current deviation control parameter corresponds to a difference between a preset current value in the operating mode and the amplitude of the current flowing through the inductor circuit. Furthermore, the control circuit is configured to correct the current deviation control parameter according to a compensation current value to improve control accuracy. The compensation current value is a difference value between the preset current value and an average value of current flowing through the second power port.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION OF THE DISCLOSURE

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

It should be noted that the relational terms such as "first" and "second" are merely used to distinguish one entity or operation from another entity or operation, and do not necessarily require or imply any such actual relationship or sequence between these entities or operations.

In addition, the term "and/or" may merely describe an association relationship of associated objects, which may include three kinds of relationships. For example, the term "A and/or B" may include three cases where A exists alone, A and B simultaneously exist, and B exists alone.

Similar reference numbers and letters represent similar terms in the following Figures, such that once an item is defined in one Figure, it does not need to be further discussed in subsequent Figures.

When a DC/DC converter is applied to charge and discharge of the lithium-ion battery, a buck circuit or a boost circuit can be formed inside the DC/DC converter, to realize the voltage conversion from DC to DC.

Figure 1:
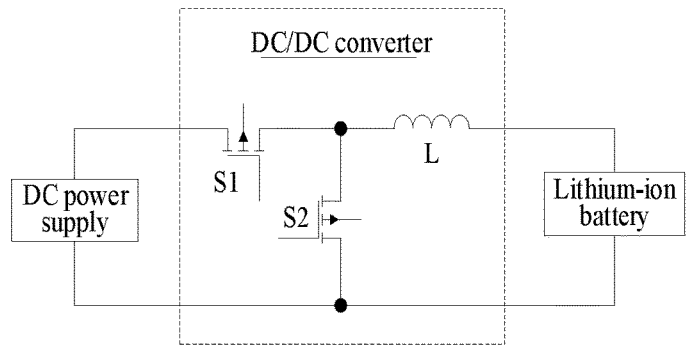
FIG. 1 illustrates a schematic diagram of a circuit structure of a DC/DC converter.
Figure 2:
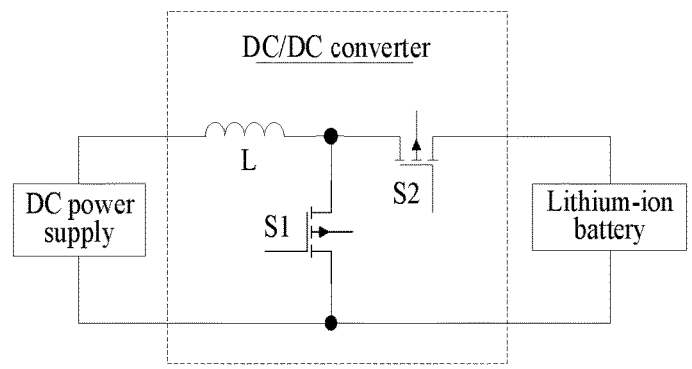
FIG. 2 illustrates a schematic diagram of a circuit structure of another DC/DC converter.

Exemplarily, as shown in FIG. 1, a buck circuit is formed inside the DC/DC converter. In other words, the buck circuit is composed of a master switch transistor S1, a freewheeling transistor S2, and an inductor L. The DC/DC converter is capable of reduce an output voltage of a DC power supply to a suitable charging voltage of the lithium-ion battery, to achieve step-down charging of the lithium-ion battery. Alternatively, as shown in FIG. 2, a boost circuit is formed inside the DC/DC converter. Therefore, the DC/DC converter is capable of boosting an output voltage of a DC power supply to a suitable charging voltage of the lithium-ion battery, to achieve boost charging of the lithium-ion battery. Each of the master switch transistor S1 and the freewheeling transistor S2 in FIG. 1 and FIG. 2 is a MOS transistor as an example. Those skilled in the art know that MOS transistor has a parasitic diode (also referred to a body diode). The drawings in the present disclosure does not illustrate the parasitic diode of the MOS transistor.

The DC/DC converter may have a problem of poor stability during operation, causing a substantially low reliability of the DC/DC converter. Specifically, the conventional DC/DC converter uses the switch transistor as the freewheeling transistor (in other words, uses the switch transistor as the auxiliary transistor), and the master transistor and the auxiliary transistor often adopt a strict complementary conduction control strategy. In other words, when the master transistor is turned on, the auxiliary transistor is turned off; and when the master transistor is turned off, the auxiliary transistor is turned on. In view of this, when the inductor current is intermittent, the auxiliary transistor may still remain in a turned-on state after the freewheeling ends, which may cause problems such as a reverse current flow, or even cause the DC/DC converter to fail converting the voltage normally, thereby causing poor stability of the DC/DC converter.

For example, the DC/DC converters shown in FIG. 1 and FIG. 2 each uses the switch transistor S2 as the freewheeling transistor (in other words, the switch transistor S2 serves as the auxiliary transistor). When the current of the inductor L is intermittent, the switch transistor S2 may still remain in a turned-on state after the freewheeling ends. In view of this, the battery may discharge through the switch transistor S2 and the inductor L, which causes the reverse of the current flowing through the inductor L, and causes a positive feedback in serious situation, thereby causing a control failure. The over-current protection may start, or the power device may be damaged, thereby causing the DC/DC converter to fail converting the voltage normally, and causing poor stability of the converter.

Figure 3:
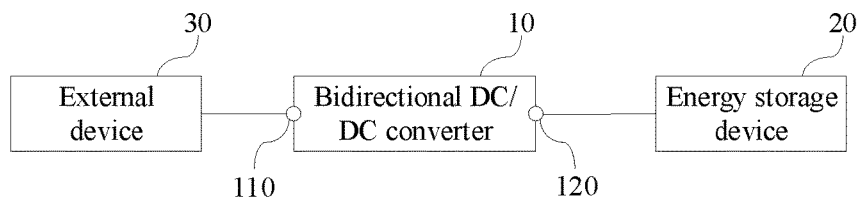
FIG. 3 illustrates a schematic diagram of a circuit structure of an exemplary energy storage system consistent with disclosed embodiments of the present disclosure.

The present disclosure provides an energy storage system. Referring to FIG. 3, the energy storage system may include a bidirectional DC/DC converter 10 and an energy storage device 20. In one embodiment, the bidirectional DC/DC converter 10 may include a first power port 110 configured to be connected to a DC bus and a second power port 120 configured to be connected to the energy storage device 20. The DC bus may be directly connected to a DC load or a DC power supply, or may be connected to an AC load or an AC power supply through an AC/DC conversion circuit. For convenience, the device connected to the DC bus may be referred to as an external device 30. The energy storage device 20 may be a device that has electrical energy storage capability, such as a lithium-ion battery, etc.

Figure 4:
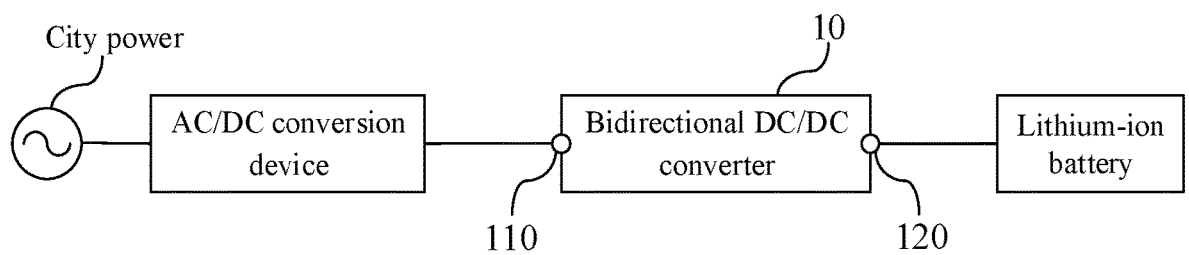
FIG. 4 illustrates a schematic diagram of a circuit structure when an exemplary energy storage system is applied to charge and discharge of a lithium-ion battery consistent with disclosed embodiments of the present disclosure.

In one embodiment, the energy storage system may be used for the charge and discharge test of the lithium-ion battery, and may be used for the normal operation of the lithium-ion battery. Referring to FIG. 4, the energy storage device 20 may be a lithium-ion battery. The DC bus connected with the first power port 110 may be connected to the city power through an AC/DC conversion device, and the city power as an AC power supply may charge the energy storage device. At the same time, because the bidirectional DC/DC converter is a bidirectional conversion circuit, after passing through the bidirectional DC/DC converter, the direct current outputted by the energy storage device may be converted into an alternating current through the AC/DC conversion device, and then may be incorporated into the power network.

Figure 5:
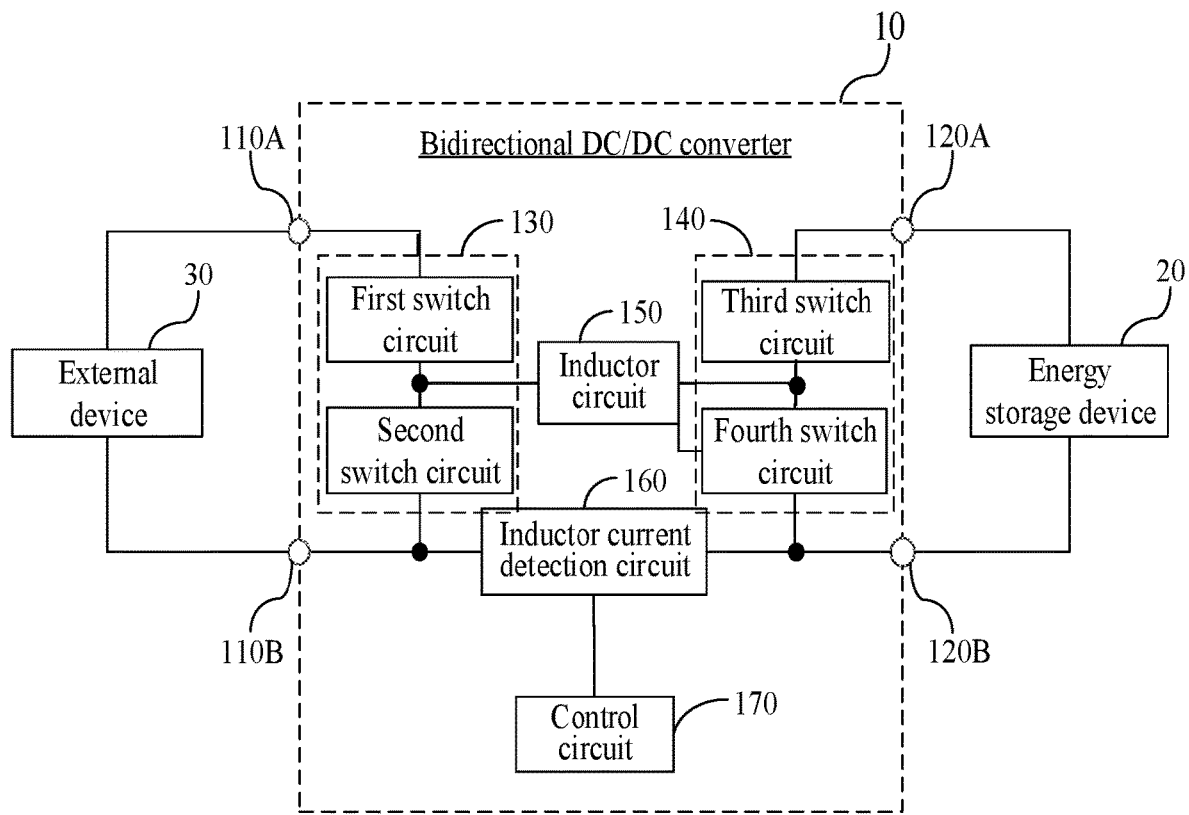
FIG. 5 illustrates a schematic diagram of a circuit structure of an exemplary bidirectional DC/DC converter consistent with disclosed embodiments of the present disclosure.

Therefore, referring to FIG. 5, the bidirectional DC/DC converter 10 in the present disclosure may include a first half-bridge circuit 130, a second half-bridge circuit 140, an inductor circuit 150, an inductor current detection circuit 160, and a control circuit 170. Each of the first half-bridge circuit 130 and the second half-bridge circuit 140 may include two switch circuits connected in series. The first half-bridge circuit 130 may be connected to the first power port 110, and the second half-bridge circuit 140 may be connected to the second power port 120. The inductor circuit 150 may include an inductor, where one end of the inductor may be connected to a connection point of the two switch circuits in the first half-bridge circuit 130, and another end of the inductor may be connected to a connection point of the two switch circuits in the second half-bridge circuit 140. It should be understood that the first half-bridge circuit 130 and the second half-bridge circuit 140 may form a H-bridge loop through the inductor circuit 150. In view of this, the inductor current detection circuit 160 may be configured on the H-bridge loop for collecting an amplitude of the current flowing through the inductor circuit 150.

The control circuit 170 may include a microcontroller unit (MCU), a digital signal processor (DSP) control system, etc., which may be connected to four switch circuits, respectively (the connection relationship may not be shown in the Figure). In one embodiment, the control circuit may be connected to a control terminal of each switch circuit, respectively. In addition, the control circuit 170 may be connected to the inductor current detection circuit 160.

The control circuit 170 may be configured to: determine an operating mode of the bidirectional DC/DC converter 10, and according to the operating mode, determine one of the first and second half-bridge circuits as a target half-bridge circuit, and determine one switch circuit in the target half-bridge circuit as a target switch circuit, and another switch circuit as a freewheeling switch circuit. In one embodiment, according to the specific operating mode, the control circuit 170 may determine the target half-bridge circuit among the first and second half-bridge circuits, and at the same time, may determine the target switch circuit and the freewheeling switch circuit. Therefore, in the bidirectional DC/DC converter 10, the target half-bridge circuit and the inductor circuit 150 may form a step-up circuit or a step-down circuit, e.g., a boost circuit or a buck circuit.

In addition, the control circuit 170 may control the target switch circuit to be turned on and off periodically, may control the freewheeling switch circuit to be turned off when the target switch circuit is turned on, and may control the freewheeling switch circuit to be turned on when the target switch circuit is turned off. Further, when the amplitude of the current flowing through the inductor circuit 150 is less than or equal to a preset threshold value, the control unit 170 may control the freewheeling switch circuit to be turned off. In other words, after the freewheeling switch circuit is turned on, it may be determined whether the freewheeling switch circuit needs to be turned off in advance according to the magnitude relationship between the amplitude of current flowing through the inductor circuit 150 and the preset threshold value. The preset threshold value may be a current threshold value that determines whether the energy storage release in the inductor circuit 150 is at the end or near the end.

In one embodiment, the preset threshold value may be set 0A. In certain embodiments, the preset threshold value may be set within a certain range. As long as the current is within such range, the energy stored in the inductor circuit 150 may be determined to be fully released. Therefore, by comparing the actually detected amplitude of current flowing through the inductor circuit 150 with the preset threshold value when the energy stored in the inductor circuit 150 is fully released, it may be determined whether the energy stored in the inductor circuit 150 is fully released, in other words, whether there is a freewheeling current in the circuit, such that the freewheeling switch circuit may be turned off when the freewheeling ends.

In one embodiment, when the inductor circuit 150 forms a freewheeling current through the freewheeling switch circuit, through continuous discharge, the electric energy stored in the inductor circuit 150 may be gradually released and may become less and less, and the current in the entire freewheeling circuit may gradually decrease. Therefore, when the amplitude of the current flowing through the inductor circuit 150 is lower than the preset threshold value, the control circuit 170 may determine that the electric energy stored in the inductor circuit 150 may have been fully released, or may be about to be fully released, such that the control circuit 170 may control the freewheeling switch circuit to be turned off. In one embodiment, the turn-off time point of the freewheeling switch circuit may be determined according to the actual current detection in the loop where the inductor circuit 150 is located, such that the freewheeling switch circuit may be turned-off in time after the freewheeling of the inductor circuit 150 ends.

Conventional master switch transistor and freewheeling switch transistor are strictly complementary conduction. In other words, when one of the master switch transistor and freewheeling switch transistor is turned on, the other one is turned off. The freewheeling switch transistor is turned off only when the master switch transistor is turned on again, which causes the turn-on time length of the freewheeling switch transistor to be greater than the time length of freewheeling of the inductor circuit. In other words, there is a situation where the freewheeling switch transistor is still turned on after the freewheeling of the inductor circuit ends. In view of this, the power supply equipment in the freewheeling loop may discharge and may cause the current to flow in a reverse direction, which causes a positive feedback in serious situation, thereby causing a control failure. The over-current protection of the DC/DC converter starts, or the power device is damaged. In the present disclosure, the freewheeling switch circuit may be turned off in time when the freewheeling ends, thereby effectively avoiding such problem. At the same time, the switch circuit may be used as the freewheeling of the inductor circuit 150, which may not cause substantially large energy loss.

Figure 6:
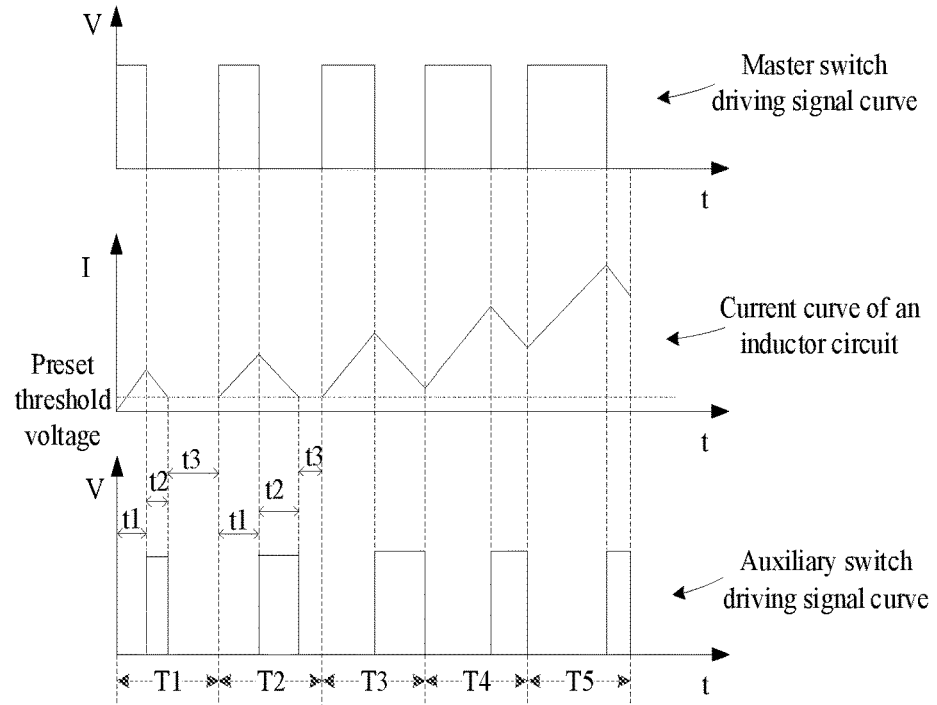
FIG. 6 illustrates a control timing sequence diagram for controlling turn-off of a freewheeling switch circuit according to an amplitude of a current flowing through an inductor circuit consistent with disclosed embodiments of the present disclosure.

In one embodiment, referring to FIG. 6, the control circuit 170 may use a pulse-width modulation (PWM) control signal corresponding to a "master switch driving signal curve" in the Figure to control the target switch circuit, such that the target switch circuit may be turned on and off periodically. It should be understood that each on-off period T of the target switch circuit may be the same. In other words, the periods T1, T2, T3, T4, and T5 may be the same. In addition, the amplitude of current flowing through the inductor circuit 150 at each moment may be a value shown in the corresponding curve in the Figure, and the specific value of the preset threshold value may be set reasonably.

In view of this, when the target switch circuit is turned on, the control circuit 170 may control the freewheeling switch circuit (i.e., the auxiliary switch) to be turned off, and at this moment, the amplitude of current flowing through the inductor circuit 150 may become larger and larger. For example, during the on-off periods of T1 and T2, the target switch circuit may be in a turned-on state during the t1 time period. During the t1 time period, the control circuit 170 may need to control the freewheeling switch circuit to be turned off, and the amplitude of current flowing through the inductor circuit 150 may become larger and larger.

Following, when the target switch circuit is turned off, the control circuit 170 may need to control the freewheeling switch circuit to be turned on. At such moment, the inductor circuit 150 may form a freewheeling current through the freewheeling switch circuit, and as the freewheeling continues, the amplitude of current flowing through the inductor circuit 150 may become smaller and smaller. Thus, when the amplitude of current flowing through the inductor circuit 150 is lower than the preset threshold value, the control circuit 170 may control the freewheeling switch circuit to be turned off. In other words, the freewheeling switch circuit may be turned off in time when the freewheeling ends. For example, during the on-off periods of T1 and T2, the inductor circuit 150 may form a freewheeling current in the t2 time period, and as the freewheeling continues, the amplitude of current flowing through the inductor circuit 150 may be less than the preset threshold value, and, thus, the control circuit 170 may control the freewheeling switch circuit to be turned off in advance, and both the master switch circuit and the freewheeling switch circuit may be turned off during the t3 time period.

It should be noted that in the on-off periods of T3, T4 and T5, the amplitude of current flowing through the inductor circuit 150 may not be less than the preset threshold value, and, thus, the control circuit 170 may not need to control the freewheeling switch circuit to be turned off in advance. In other words, the early turn-off may be performed when the freewheeling ends and the master switch transistor is not turned on. When the freewheeling does not end and the master switch transistor has been turned on, the freewheeling switch transistor may be directly turned off.

Figure 7:
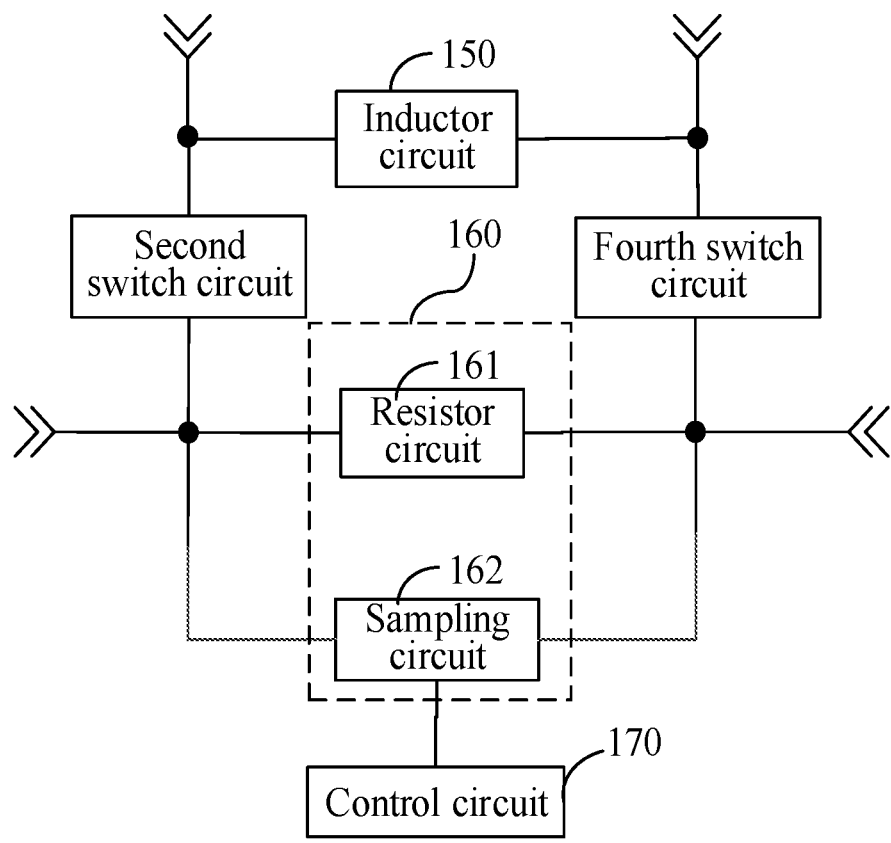
FIG. 7 illustrates a schematic diagram of a circuit structure of an exemplary inductor current detection circuit consistent with disclosed embodiments of the present disclosure.

In one embodiment, referring to FIG. 7, the inductor current detection circuit 160 may include a resistor circuit 161 and a sampling circuit 162. The resistor circuit 161 may include a high-precision resistor, and may be configured on the aforementioned H-bridge loop. The sampling circuit 162 may connect the resistor circuit 161 and control circuit 170. Specifically, when the bidirectional DC/DC converter 10 is in operation, the resistor circuit 161 and the inductor circuit 150 may be connected in series. Therefore, the current flowing through the resistor circuit 161 may be equal to the current flowing through the inductor circuit 150. Thus, the control circuit 170 may determine the amplitude of the current flowing through the inductor circuit 150 through the sampling circuit 162. For example, the control circuit 170 may acquire a voltage value across the resistor circuit 161 through the sampling circuit 162 and may determine the amplitude of the current flowing through the resistor circuit 161 according to the voltage value and a resistance value of the resistor circuit 161. Because the resistor circuit 161 and the inductor circuit 150 are connected in series in a same loop, the amplitude of the current flowing through the inductor circuit 150 may be determined.

Figure 8:
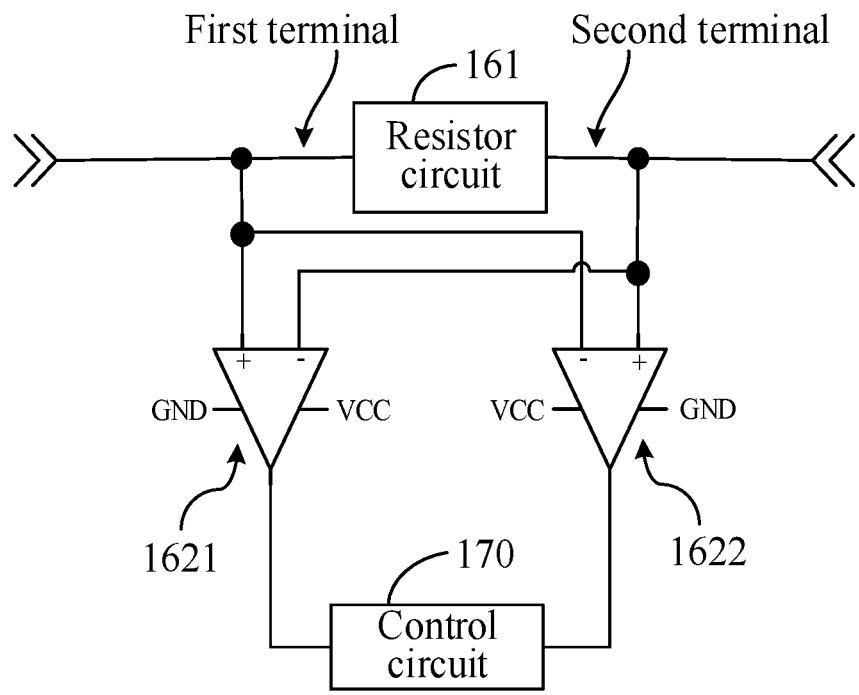
FIG. 8 illustrates a schematic diagram of a circuit structure of an exemplary sampling circuit consistent with disclosed embodiments of the present disclosure.

In one embodiment, referring to FIG. 8, the sampling circuit 162 may include a first differential circuit 1621 and a second differential circuit 1622. A positive input terminal of the first differential circuit 1621 may be connected to a first terminal of the resistor circuit 161, and a negative input terminal of the first differential circuit 1621 may be connected to a second terminal of the resistor circuit 161. A signal output terminal of the first differential circuit 1621 may be connected to the control circuit 170. Therefore, when the direction of current flowing through the resistor circuit 161 is from the first terminal to the second terminal, the control circuit 170 may determine the amplitude of the current flowing through the inductor circuit 150 through the first differential circuit 1621. For example, the first differential circuit 1621 may collect the voltage across the resistor circuit 161 and may generate a corresponding electrical signal, such that the control circuit 170 may determine the voltage value across the resistor circuit 161 according to the electrical signal inputted by the first differential circuit 1621, and then may further determine the amplitude of current flowing through the inductor circuit 150.

Similarly, a positive input terminal of the second differential circuit 1622 may be connected to the second terminal of the resistor circuit 161, and a negative input terminal of the second differential circuit 1622 may be connected to the first terminal of the resistor circuit 161. A signal output terminal of the second differential circuit 1622 may be connected to the control circuit 170. Therefore, when the direction of the current flowing through the resistor circuit 161 is from the second terminal to the first terminal, the control circuit 170 may determine the amplitude of the current flowing through the inductor circuit 150 through the second differential circuit 1622.

In one embodiment, the control circuit 170 may be configured to determine the operating mode of the bidirectional DC/DC converter 10, which may include: obtaining an operating instruction, and according to the operating instruction and a magnitude relationship between the voltage value of the first power port 110 and the voltage value of the second power port 120, determining the operating mode. The operating mode of the bidirectional DC/DC converter 10 may include step-up charging, step-up discharging, step-down charging, and step-down discharging. In one embodiment, the operating instruction may include a charging instruction, a discharging instruction, etc. The operating instruction may be sent to the control circuit 170 by the monitoring host computer in a communication manner, or a user may directly operate an instruction button on the converter to issue the operating instruction. For example, the monitoring host computer may issue specific operating instruction to the control circuit 170 according to the user's operation. For another example, the user may directly operate a discharge switch button or a charge switch button on the converter to issue the specific operating instruction.

Figure 9:
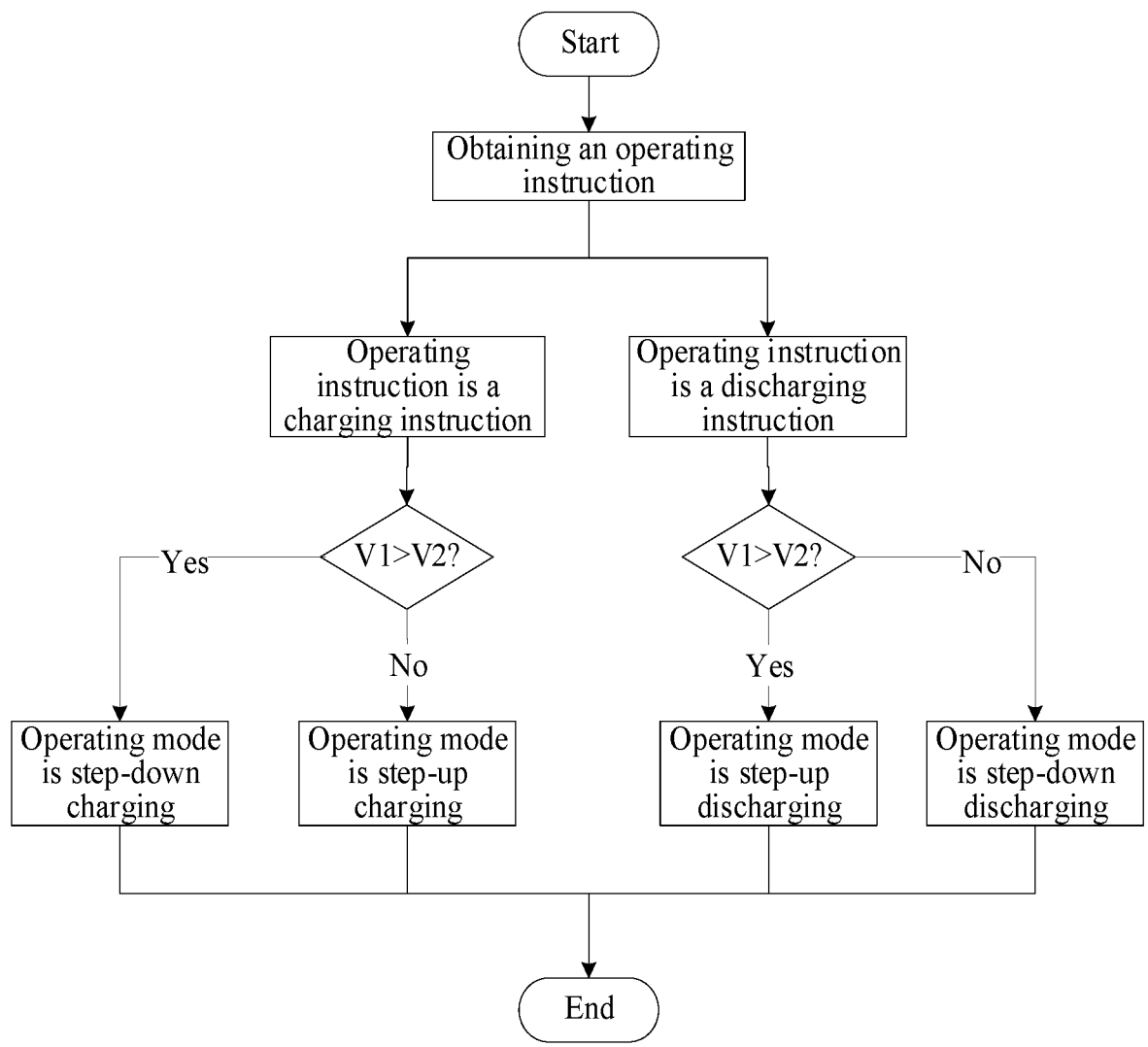
FIG. 9 illustrates a schematic flowchart of determining an operating mode by an exemplary control circuit consistent with disclosed embodiments of the present disclosure.

Therefore, the control circuit 170 may receive the operating instruction, and may determine the operating mode in combination with the magnitude relationship between the voltage value of the first power port 110 and the voltage value of the second power port 120. For example, referring to FIG. 9, when the operating instruction is a charging instruction, if the voltage value of the first power port 110 (V1 in the Figure) exceeds the voltage value of the second power port 120 (V2 in the Figure), the operating mode may be determined as step-down charging, otherwise the operating mode may be determined as step-up charging. Similarly, when the operating instruction is a discharging instruction, if the voltage value of the first power port 110 exceeds the voltage value of the second power port 120, the operating mode may be determined as step-up discharging, otherwise the operating mode may be determined as step-down discharging.

In one embodiment, referring to FIG. 5, the first half-bridge circuit 130 may include a first switch circuit and a second switch circuit that are connected in series, and the second half-bridge circuit 140 may include a third switch circuit and a fourth switch circuit that are connected in series. The first switch circuit and the third switch circuit may serve as an upper bridge arm of the corresponding half-bridge circuit, respectively, and the second switch circuit and the fourth switch circuit may serve as a lower bridge arm of the corresponding half-bridge circuit, respectively. Specifically, the first switch circuit may serve as the upper bridge arm of the first half-bridge circuit 130, and may be connected to an anode 110A of the first power port 110. The second switch circuit may serve as the lower bridge arm of the first half-bridge circuit 130, and may be connected to a cathode 110B of the first power port 110. Similarly, the third switch circuit may serve as the upper bridge arm of the second half-bridge circuit 140, and may be connected to an anode 120A of the second power port 120, and the fourth switch circuit may serve as the lower bridge arm of the second half-bridge circuit 140, and may be connected to a cathode 120B of the second power port 120. In addition, in one embodiment, each switch circuit may include one switch transistor or a plurality of switch transistors connected in parallel, e.g., one MOS transistor or three MOS transistors connected in parallel, etc. At the same time, the switch transistor may have a body diode, etc., and the body diode may not be shown in the Figure.

Therefore, the control circuit 170 may determine the target half-bridge circuit, the target switch circuit, and the freewheeling switch circuit according to the operating mode. The target switch circuit may be understood as the master switch, and the freewheeling switch circuit may be understood as the auxiliary switch. In view of this, the bidirectional DC/DC converter 10 may form a step-up circuit or a step-down circuit through the target half-bridge circuit and the inductor circuit 150. The specific process may include following.

Figure 10A:
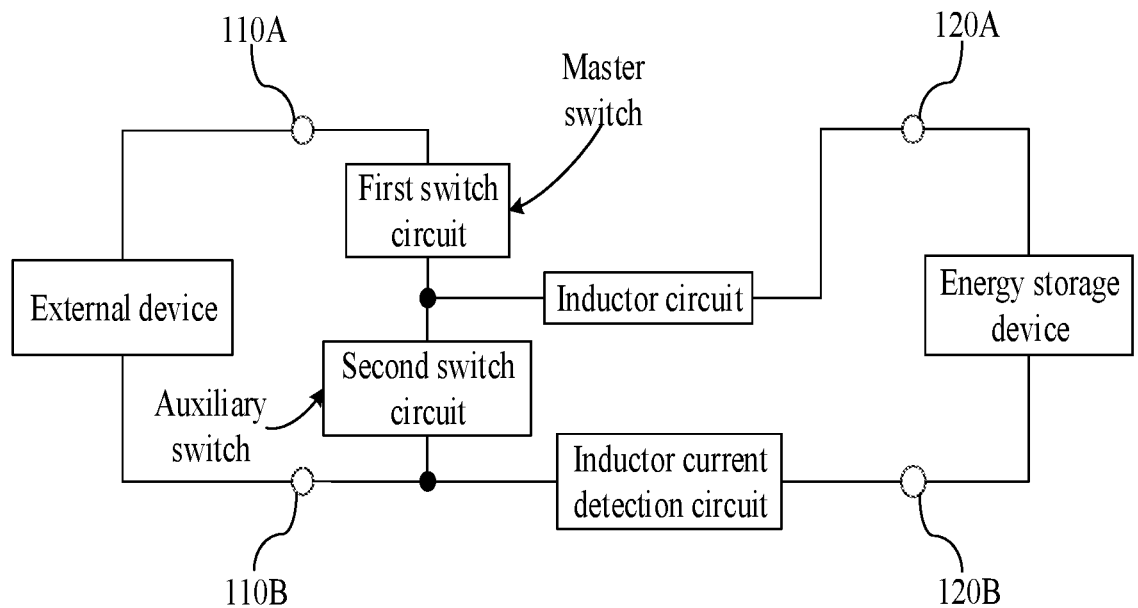
FIG. 10A illustrates a schematic diagram of a circuit structure of an exemplary bidirectional DC/DC converter when an operating mode is step-down charging consistent with disclosed embodiments of the present disclosure.

(1) When the operating mode is step-down charging, the control circuit 170 may determine that the first half-bridge circuit 130 is the target half-bridge circuit, and may determine that the first switch circuit is the target switch circuit and the second switch circuit is the freewheeling switch circuit. In other words, the first switch circuit is the master switch, and the second switch circuit is the auxiliary switch. Referring to FIG. 10A, a buck step-down circuit may be formed in the bidirectional DC/DC converter 10 through the first half-bridge circuit 130 and the inductor circuit 150. In view of this, the second half-bridge circuit 140 may be in a turned-off state, and the current formed by the first half-bridge circuit 130 and the inductor circuit 150 may flow through the body diode of the switch transistor in the second half-bridge circuit 140 and then may be outputted to the energy storage device 20. To facilitate understanding of the circuit, the second half-bridge circuit 140 in the turned-off state may be omitted in FIG. 10A. In certain embodiments, the third switch circuit may be kept in the turned-on state, such that the inductor circuit 150 may be connected to the anode 120A of the second power port 120, which may not be limited to the foregoing manner.

Figure 10B:
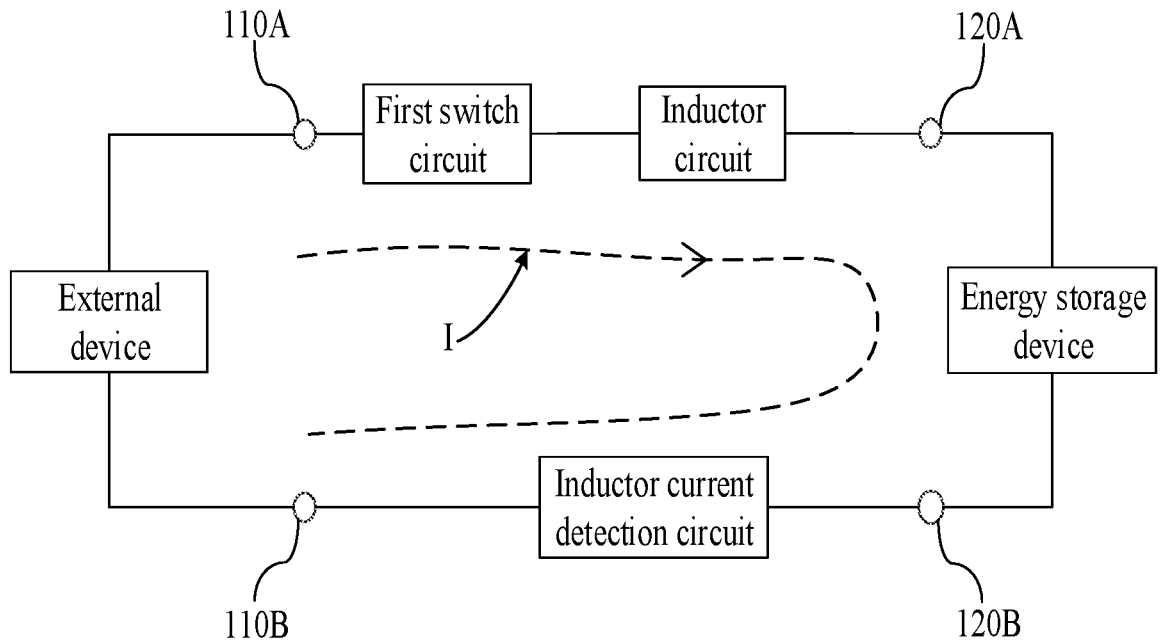
FIG. 10B illustrates a schematic diagram of a circuit structure of an exemplary bidirectional DC/DC converter in FIG. 10A when a first switch circuit is turned on and a second switch circuit is turned off consistent with disclosed embodiments of the present disclosure.
Figure 10C:
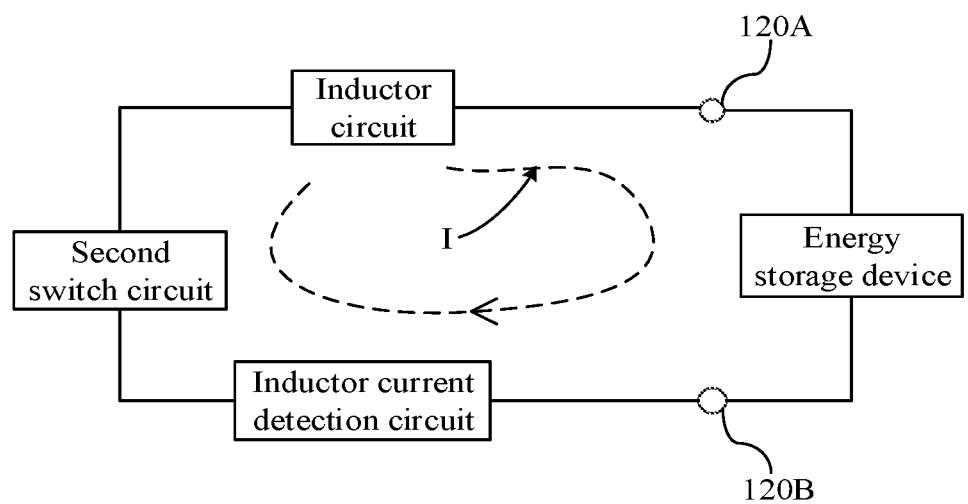
FIG. 10C illustrates a schematic diagram of a circuit structure of an exemplary bidirectional DC/DC converter in FIG. 10A when a first switch circuit is turned off and a second switch circuit is turned on consistent with disclosed embodiments of the present disclosure.

In one embodiment, when the first switch circuit is turned on and the second switch circuit is turned off, referring to FIG. 10B, the external device 30 may charge the energy storage device 20 through the first switch circuit, and at the same time, may charge the inductor circuit 150. FIG. 10B may omit the second half-bridge circuit 140 in the turned-off state and the second switch circuit in the turned-off state. To clearly illustrate the operation of the circuit in subsequent drawings, the switch circuit in the turned-off state may be omitted. When the first switch circuit is turned off and the second switch circuit is turned on, referring to FIG. 10C, the electric energy stored in the inductor circuit 150 may form a freewheeling current through the second switch circuit, to charge the energy storage device 20.

Figure 10D:
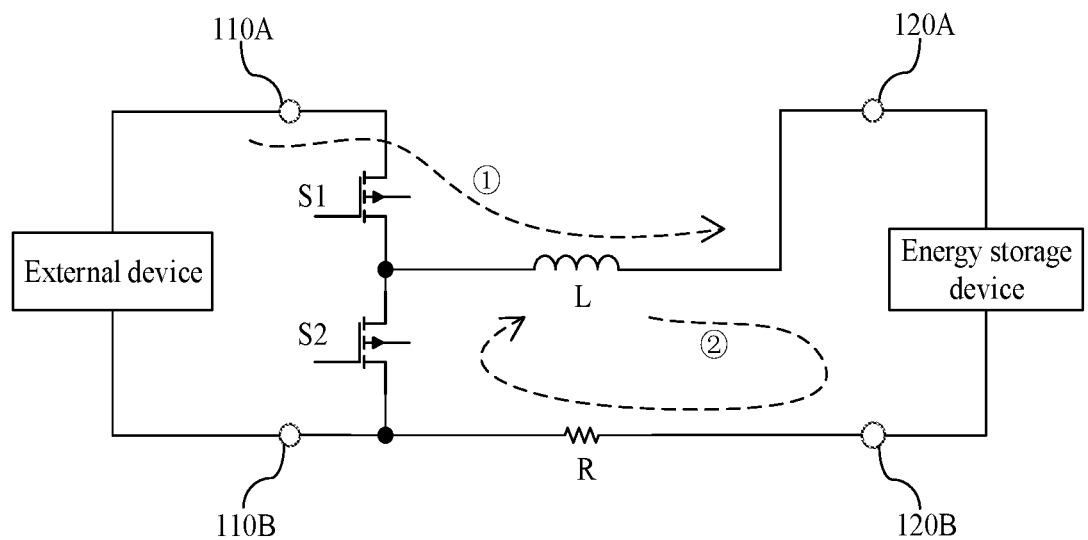
FIG. 10D illustrates a schematic diagram of a circuit structure of another exemplary bidirectional DC/DC converter when an operating mode is step-down charging consistent with disclosed embodiments of the present disclosure.

In one embodiment, referring to FIG. 10D, the first switch circuit may include a switch transistor S1, the second switch circuit may include a switch transistor S2, the inductor circuit 150 may include an inductor L, and each of the switch transistor S1 and the switch transistor S2 may include at least one MOS transistor. The resistor circuit 161 in the inductor current detection circuit 160 may include a resistor R. When the operating mode of the bidirectional DC/DC converter 10 is step-down charging, the switch transistor S1 may be the master switch, and the switch transistor S2 may be the auxiliary switch. When the master switch S1 is turned on and the auxiliary switch S2 is turned off, the current may flow along a direction shown in a curve ① in FIG. 10D. When the master switch S1 is turned off and the auxiliary switch S2 is turned on, the current may flow along a direction shown in a curve ② in FIG. 10D.

Figure 11A:
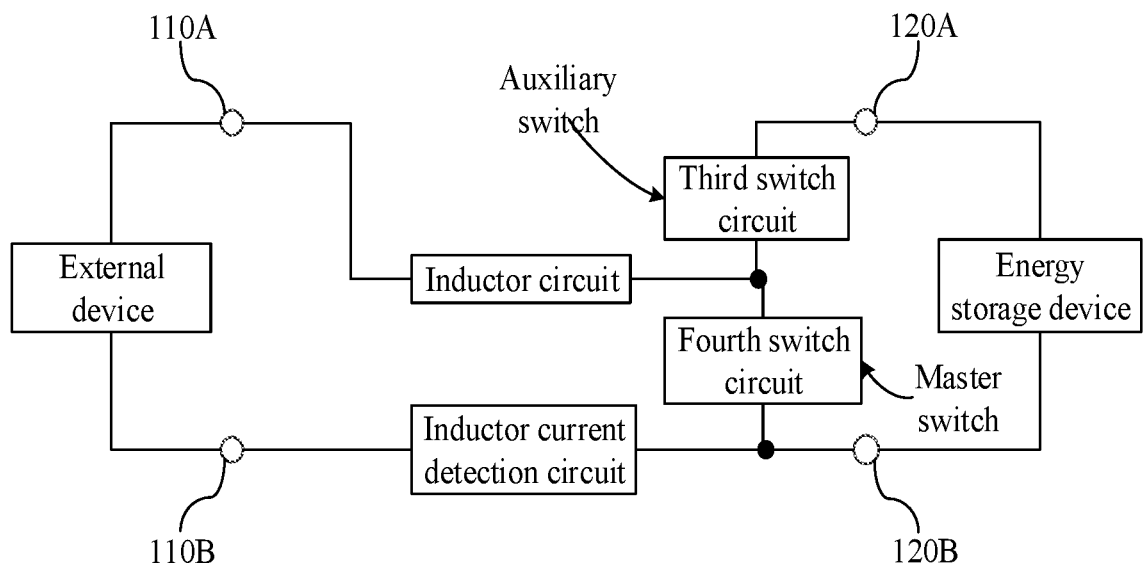
FIG. 11A illustrates a schematic diagram of a circuit structure of an exemplary bidirectional DC/DC converter when an operating mode is step-up charging consistent with disclosed embodiments of the present disclosure.

(2) When the operating mode is step-up charging, the control circuit 170 may determine that the second half-bridge circuit 140 is the target half-bridge circuit, and may determine that the fourth switch circuit is the target switch circuit and the third switch circuit is the freewheeling switch circuit. In other words, the fourth switch circuit may be the master switch, and the third switch circuit may be the auxiliary switch. Referring to FIG. 11A, a boost step-up circuit may be formed in the bidirectional DC/DC converter 10 through the second half-bridge circuit 140 and the inductor circuit 150. In view of this, the first half-bridge circuit 130 may be in the turned-off state. The current in the inductor circuit may flow through the body diode of the switch transistor of the first switch circuit, and then may be outputted through the first power port 110. In certain embodiments, the first switch circuit may be kept in the turned-on state, such that the inductor circuit 150 may be connected to the anode 110A of the first power port 110, which may not be limited to the foregoing manner.

Figure 11B:
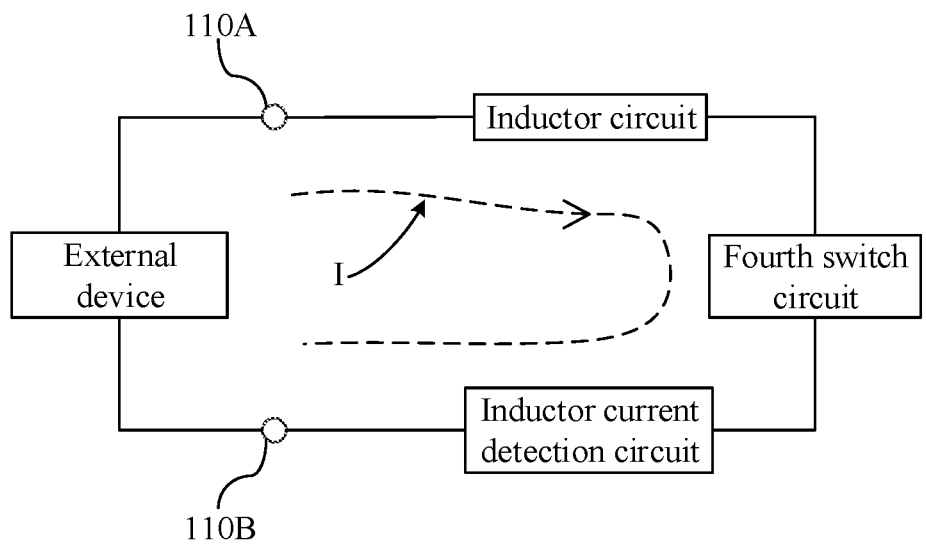
FIG. 11B illustrates a schematic diagram of a circuit structure of an exemplary bidirectional DC/DC converter in FIG. 11A when a fourth switch circuit is turned on and a third switch circuit is turned off consistent with disclosed embodiments of the present disclosure.
Figure 11C:
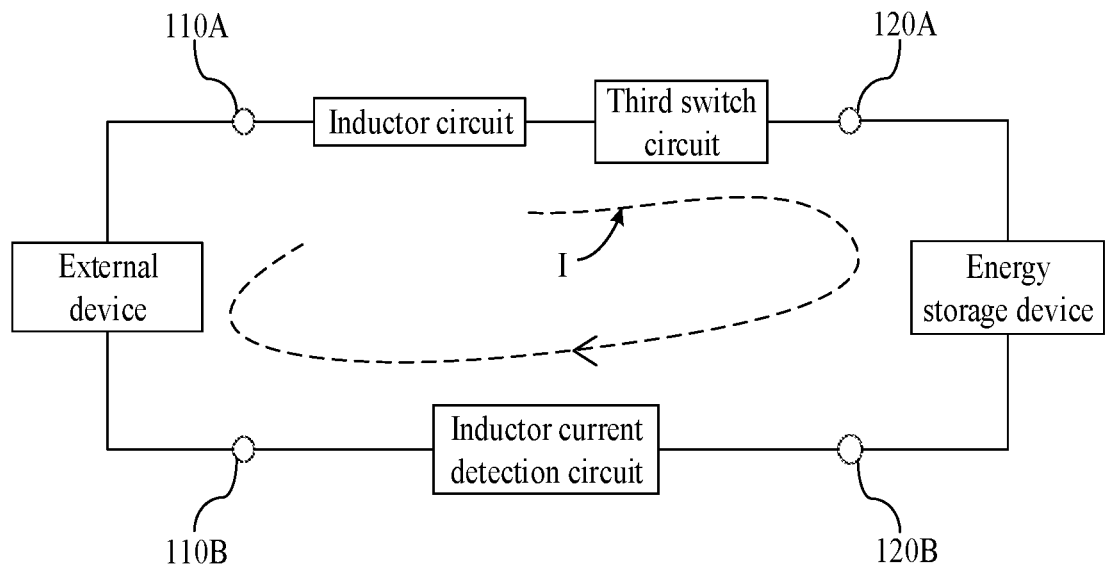
FIG. 11C illustrates a schematic diagram of a circuit structure of an exemplary bidirectional DC/DC converter in FIG. 11A when a fourth switch circuit is turned off and a third switch circuit is turned on consistent with disclosed embodiments of the present disclosure.

In one embodiment, referring to FIG. 11B, when the fourth switch circuit is turned on and the third switch circuit is turned off, the external device 30 may charge the inductor circuit 150 through the fourth switch circuit. Referring to FIG. 11C, when the third switch circuit is turned on and the fourth switch circuit is turned off, the electric energy stored in the inductor circuit 150 may form a freewheeling current through the third switch circuit, and the external device 30 and the inductor circuit 150 may charge the energy storage device 20 together.

Figure 11D:
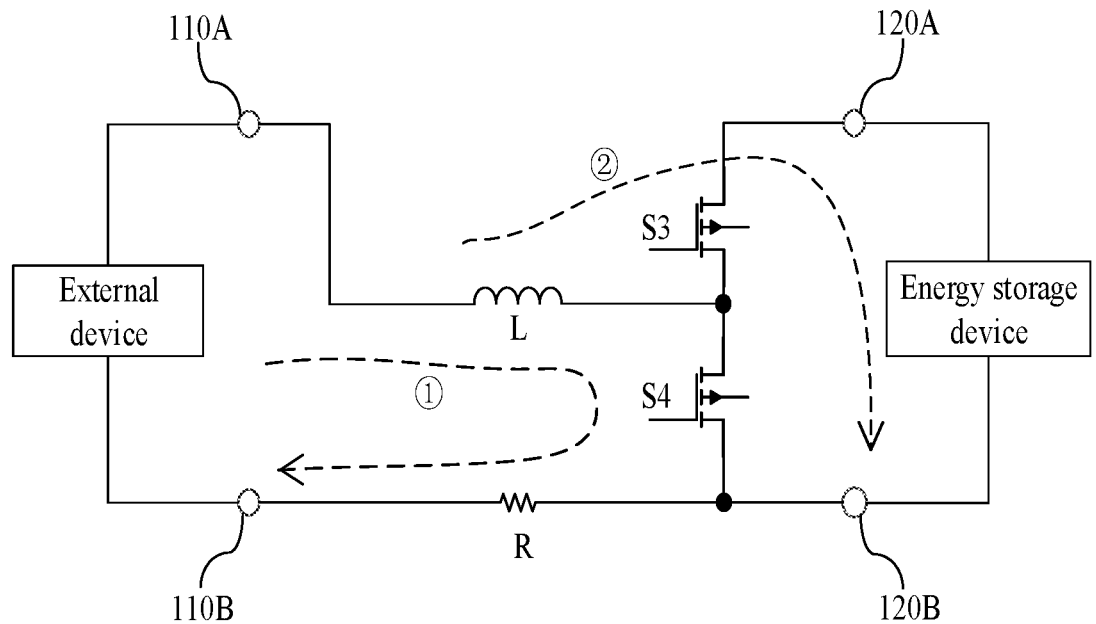
FIG. 11D illustrates a schematic diagram of a circuit structure of another exemplary bidirectional DC/DC converter when an operating mode is step-up charging consistent with disclosed embodiments of the present disclosure.

In one embodiment, referring to FIG. 11D, the third switch circuit may include a switch transistor S3, the fourth switch circuit may include a switch transistor S4, the inductor circuit 150 may include an inductor L, and the resistor circuit 161 in the inductor current detection circuit 160 may include a resistor R. When the operating mode of the bidirectional DC/DC converter 10 is step-up charging, the switch transistor S4 may be the master switch, and the switch transistor S3 may be the auxiliary switch. Therefore, when the master switch S4 is turned on and the auxiliary switch S3 is turned off, the current may flow along a direction shown in a curve ① in FIG. 11D. When the master switch S4 is turned off and the auxiliary switch S3 is turned on, the current may flow along a direction shown in a curve ② in FIG. 11D.

Figure 12A:
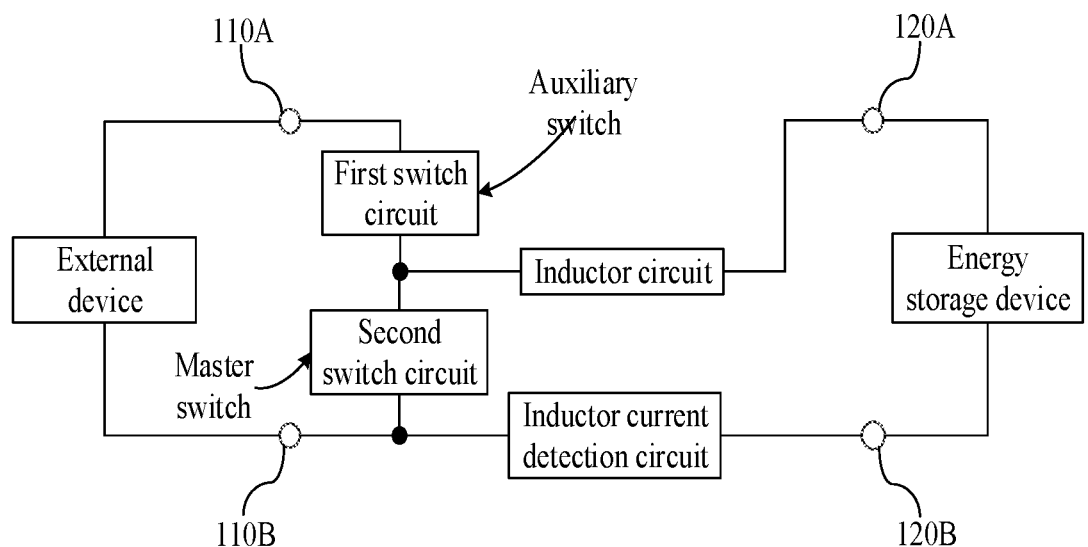
FIG. 12A illustrates a schematic diagram of a circuit structure of an exemplary bidirectional DC/DC converter when an operating mode is step-up discharging consistent with disclosed embodiments of the present disclosure.

(3) When the operating mode is step-up discharging, the control circuit 170 may determine that the first half-bridge circuit 130 is the target half-bridge circuit, and may determine that the second switch circuit is the target switch circuit and the first switch circuit is the freewheeling switch circuit. In other words, the second switch circuit may be the master switch, and the first switch circuit may be the auxiliary switch. Referring to FIG. 12A, a boost step-up circuit may be formed in the bidirectional DC/DC converter 10 through the first half-bridge circuit 130 and the inductor circuit 150. In view of this, when the second half-bridge circuit 140 is in the turned-off state, the current outputted by the energy storage device may be transmitted to the inductor circuit after flowing through the body diode of the switch transistor of the third switch circuit. In certain embodiments, the third switch circuit may be kept in the turned-on state, such that the inductor circuit 150 may be connected to the anode 120A of the second power port 120, which may not be limited to the foregoing manner.

Figure 12B:
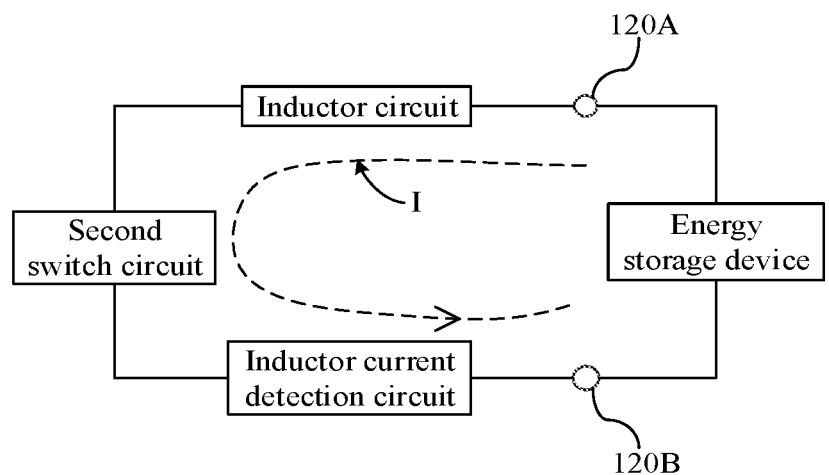
FIG. 12B illustrates a schematic diagram of a circuit structure of an exemplary bidirectional DC/DC converter in FIG. 12A when a second switch circuit is turned on and a first switch circuit is turned off consistent with disclosed embodiments of the present disclosure.
Figure 12C:
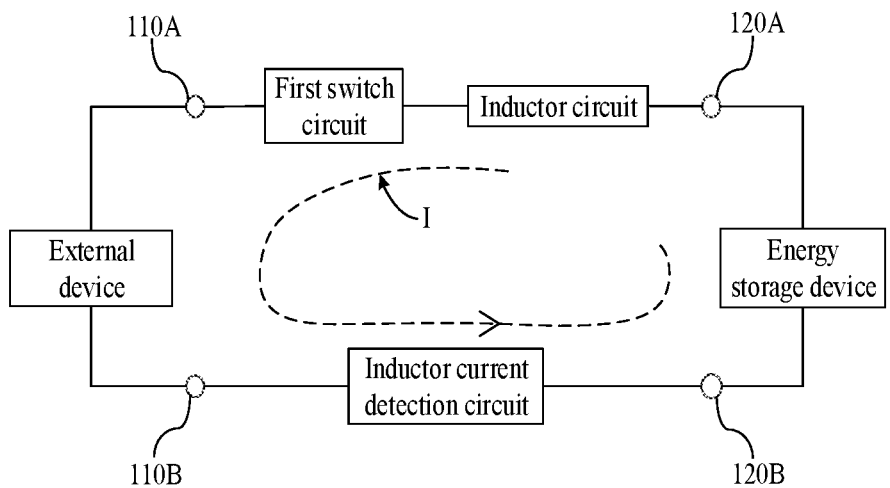
FIG. 12C illustrates a schematic diagram of a circuit structure of an exemplary bidirectional DC/DC converter in FIG. 12A when a second switch circuit is turned off and a first switch circuit is turned on consistent with disclosed embodiments of the present disclosure.
Figure 12D:
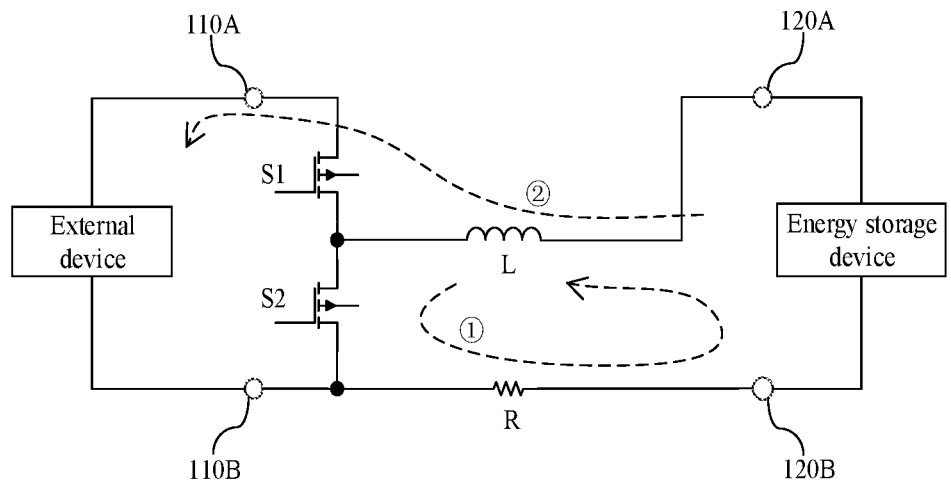
FIG. 12D illustrates a schematic diagram of a circuit structure of another exemplary bidirectional DC/DC converter when an operating mode is step-up discharging consistent with disclosed embodiments of the present disclosure.

In one embodiment, referring to FIG. 12B, when the second switch circuit is turned on and the first switch circuit is turned off, the energy storage device 20 may charge the inductor circuit 150 through the second switch circuit. Referring to FIG. 12C, when the second switch circuit is turned off and the first switch circuit is turned on, the electric energy stored in the inductor circuit 150 may form a freewheeling current through the first switch circuit, and the energy storage device 20 and the inductor circuit 150 may charge the external device 30 together. In one embodiment, referring to FIG. 12D, the first switch circuit may include a switch transistor S1, the second switch circuit may include a switch transistor S2, the inductor circuit 150 may include an inductor L, and the resistor circuit 161 in the inductor current detection circuit 160 may include a resistor R. When the operating mode of the bidirectional DC/DC converter 10 is step-up discharging, the switch transistor S2 may be the master switch, and the switch transistor S1 may be the auxiliary switch. Thus, when the master switch S2 is turned on and the auxiliary switch S1 is turned off, the current may flow along a direction shown in a curve ① in FIG. 12D. When the master switch S2 is turned off and the auxiliary switch S1 is turned on, the current may flow along a direction shown in a curve ② in FIG. 12D.

Figure 13A:
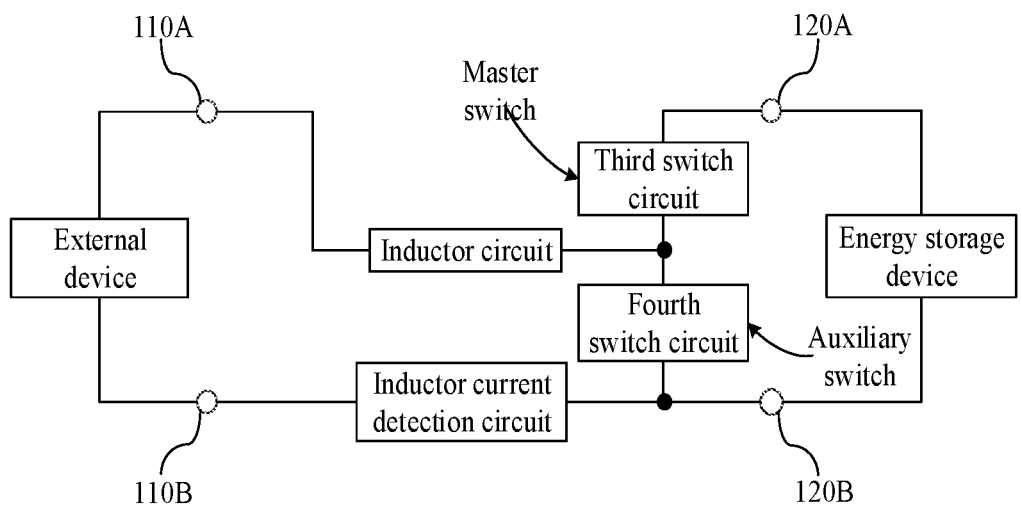
FIG. 13A illustrates a schematic diagram of a circuit structure of an exemplary bidirectional DC/DC converter when an operating mode is step-down discharging consistent with disclosed embodiments of the present disclosure.

(4) When the operating mode is step-down discharging, the control circuit 170 may determine that the second half-bridge circuit 140 is the target half-bridge circuit, and may determine that the third switch circuit is the target switch circuit and the fourth switch circuit is the freewheeling switch circuit. In other words, the third switch circuit may be the master switch, and the fourth switch circuit may be the auxiliary switch. Referring to FIG. 13A, a buck step-down circuit may be formed in the bidirectional DC/DC converter 10 through the second half-bridge circuit 130 and the inductor circuit 150. In view of this, the first half-bridge circuit 130 may be in the turned-off state, and the current in the inductor circuit may be outputted through the first power port 110 after flowing through the body diode of the switch transistor of the first switch circuit. In certain embodiments, the first switch circuit may be kept in the turned-on state, such that the inductor circuit 150 may be connected to the anode 110A of the first power port 110, which may not be limited to the foregoing manner.

Figure 13B:
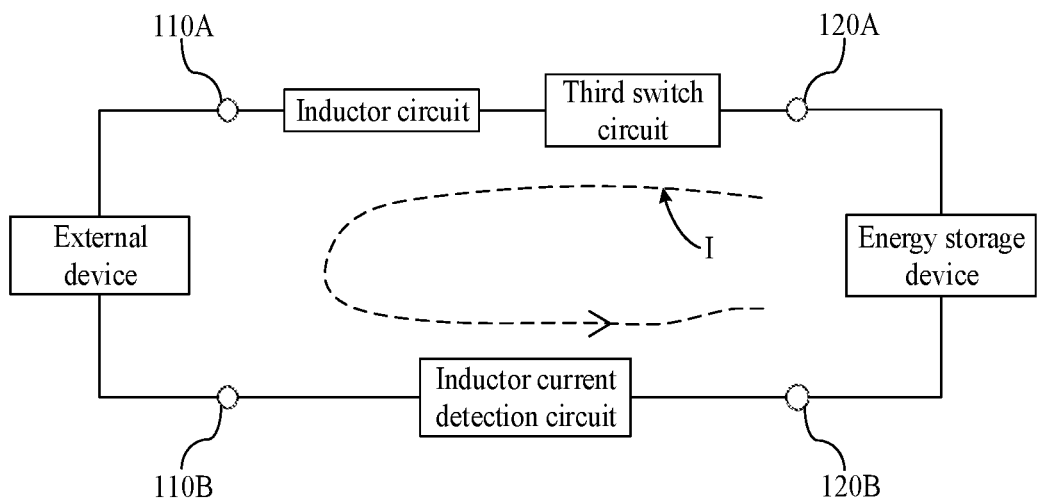
FIG. 13B illustrates a schematic diagram of a circuit structure of an exemplary bidirectional DC/DC converter in FIG. 13A when a third switch circuit is turned on and a fourth switch circuit is turned off consistent with disclosed embodiments of the present disclosure.
Figure 13C:
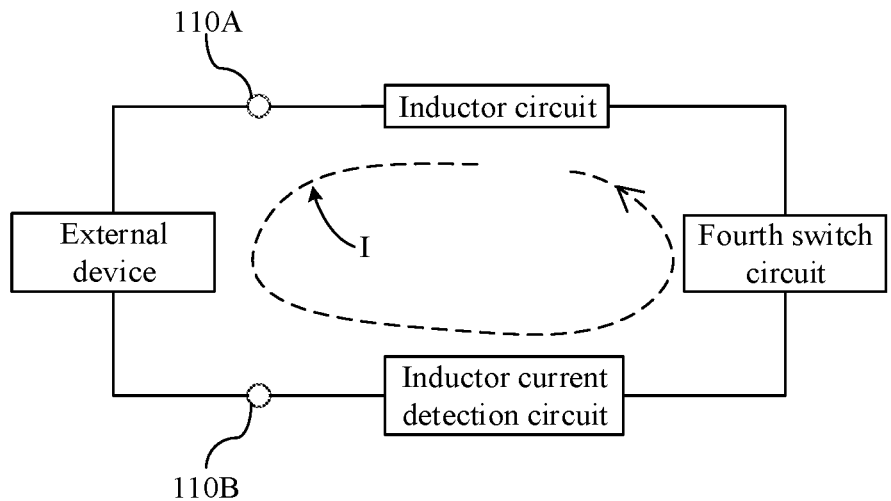
FIG. 13C illustrates a schematic diagram of a circuit structure of an exemplary bidirectional DC/DC converter in FIG. 13A when a third switch circuit is turned off and a fourth switch circuit is turned on consistent with disclosed embodiments of the present disclosure.
Figure 13D:
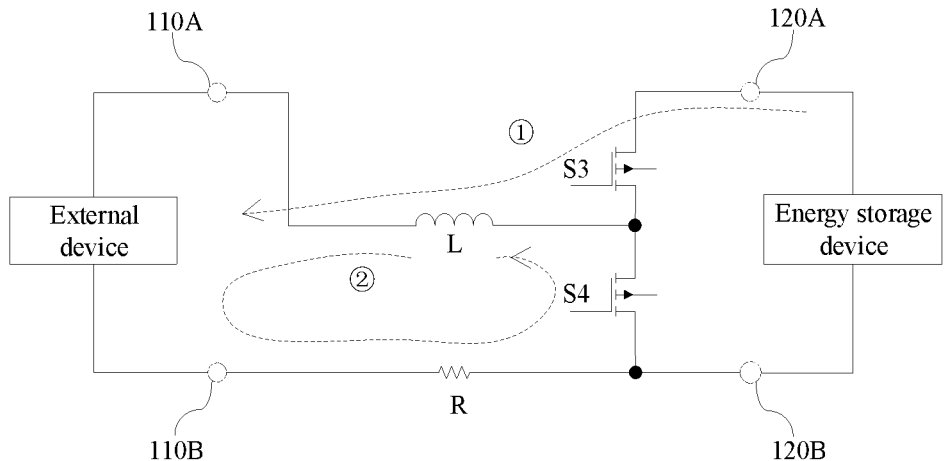
FIG. 13D illustrates a schematic diagram of a circuit structure of another exemplary bidirectional DC/DC converter when an operating mode is step-down discharging consistent with disclosed embodiments of the present disclosure.

In one embodiment, referring to FIG. 13B, when the third switch circuit is turned on and the fourth switch circuit is turned off, the energy storage device 20 may charge the external device 30 through the third switch circuit, and at the same time, may charge the inductor circuit 150. Referring to FIG. 13C, when the third switch circuit is turned off and the fourth switch circuit is turned on, the electric energy stored in the inductor circuit 150 may form a freewheeling current through the fourth switch circuit, to charge the external device 30. In one embodiment, referring to FIG. 13D, the third switch circuit may include a switch transistor S3, the fourth switch circuit may include a switch transistor S4, the inductor circuit 150 may include an inductor L, and the resistor circuit 161 in the inductor current detection circuit 160 may include a resistor R. When the operating mode of the bidirectional DC/DC converter 10 is step-down discharging, the switch transistor S3 may be the master switch, and the switch transistor S4 may be the auxiliary switch. When the master switch S3 is turned on and the auxiliary switch S4 is turned off, the current may flow along a direction shown in a curve ① in FIG. 13D. When the master switch S3 is turned off and the auxiliary switch S4 is turned on, the current may flow along a direction shown in a curve ② in FIG. 13D.

In one embodiment, when the bidirectional DC/DC converter 10 is used for charge and discharge of the energy storage device 20, to control the amplitude of the charging current or the amplitude of the discharging current of the energy storage device 20, the control circuit 170 may be configured to determine the duty cycle of the target switch circuit according to a switch control parameter. The switch control parameter may include a current deviation control parameter, and the current deviation control parameter may correspond to a difference between a preset current value in the operating mode and an amplitude of the current flowing through the inductor circuit 150.

In one embodiment, the preset current value may be the charging and discharging current value expected by the user or the system, in other words, the charging current value during charging or the discharging current value during discharging of the energy storage device 20 expected by the user or the system. In one embodiment, the preset current value may be sent to the control circuit 170 by the user through the monitoring host computer. In one embodiment, the user may send the preset current value together with the operating instruction to the control circuit 170 through the monitoring host computer, or the user may send the preset current value to the control circuit 170 for adjustment purposes during the operation of the bidirectional DC/DC converter 10. In another embodiment, the preset current value may be a preset parameter. For example, the bidirectional DC/DC converter 10 may store multiple reference values, such as a charging current reference value, a discharging current reference value, etc.

When the operating mode of the bidirectional DC/DC converter 10 is step-up charging or step-down charging, the control circuit 170 may use the charging current reference value as the aforementioned preset current value. Similarly, when the operating mode of the bidirectional DC/DC converter 10 is step-up discharging or step-down discharging, the control circuit 170 may use the discharging current reference value as the aforementioned preset current value. In one embodiment, the preset current value may be determined according to a mapping relationship table. For example, the mapping relationship table may record multiple charging current reference values and discharging current reference values corresponding to multiple application scenarios. Therefore, according to the specific application scenario, the corresponding reference value may be obtained through the mapping relationship table, and the reference value may be used as the aforementioned preset current value.

Figure 14:
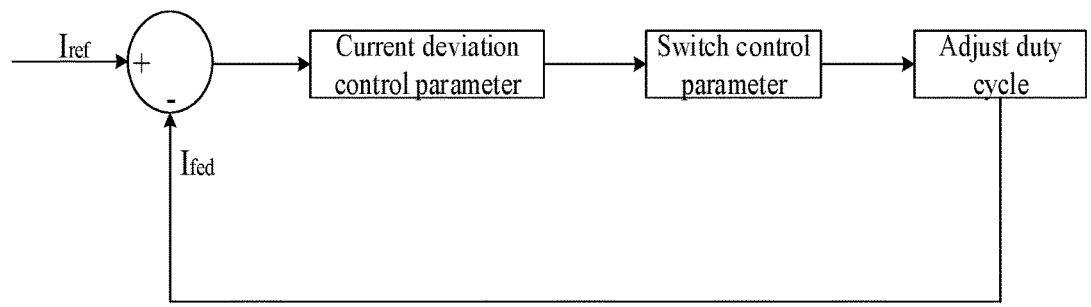
FIG. 14 illustrates a schematic diagram of an exemplary closed loop consistent with disclosed embodiments of the present disclosure.

In one embodiment, the control circuit 170 may use a PWM control signal to drive the target switch circuit to be turned on and off periodically. It should be understood that the charging current and discharging current of the energy storage device 20 may be affected by the inductor circuit 150. Therefore, the control circuit 170 may control the charging current and discharging current of the energy storage device 20 through a current closed loop. Specifically, referring to FIG. 14, the control circuit 170 may determine the current deviation control parameter according to the difference between the determined preset current value ($I_{ref}$ in the Figure) and the value of current flowing through the inductor circuit 150 ($I_{fed}$ in the Figure). Because the switch control parameter includes the current deviation control parameter, when the current deviation control parameter changes, the switch control parameter may change accordingly. Therefore, the control circuit 170 may determine the duty cycle of the target switch circuit according to the switch control parameter, in other words, may adjust the duty cycle of the PWM control signal, e.g., increasing or decreasing the duty cycle. Therefore, the amplitude of current flowing through the inductor circuit 150 may be adjusted, and then the charging current value and the discharging current value of the energy storage device 20 may be adjusted. Thus, the control circuit 170 may effectively control the charging current value or the discharging current value of the bidirectional DC/DC converter 10.

In one embodiment, to improve the control accuracy, the control circuit 170 may be configured to correct the current deviation control parameter according to the compensation current value. The compensation current value may be a difference value between the preset current value and an average value of current flowing through the second power port 120. Due to the existence of the master circuit and the freewheeling circuit, the corresponding relationship between the peak inductor current and the average value of the battery currents may be variable. In other words, under different operating conditions, the corresponding relationship may be different. Therefore, merely according to the aforementioned current peak control algorithm, the accuracy of the output current may not be guaranteed. Therefore, in one embodiment, when using the inductor current to perform deviation control, the average value of the battery currents may be used for compensation, thereby improving the control accuracy of the battery current (e.g., the current of the energy storage device 20, the charging current, or discharging current).

Figure 15:
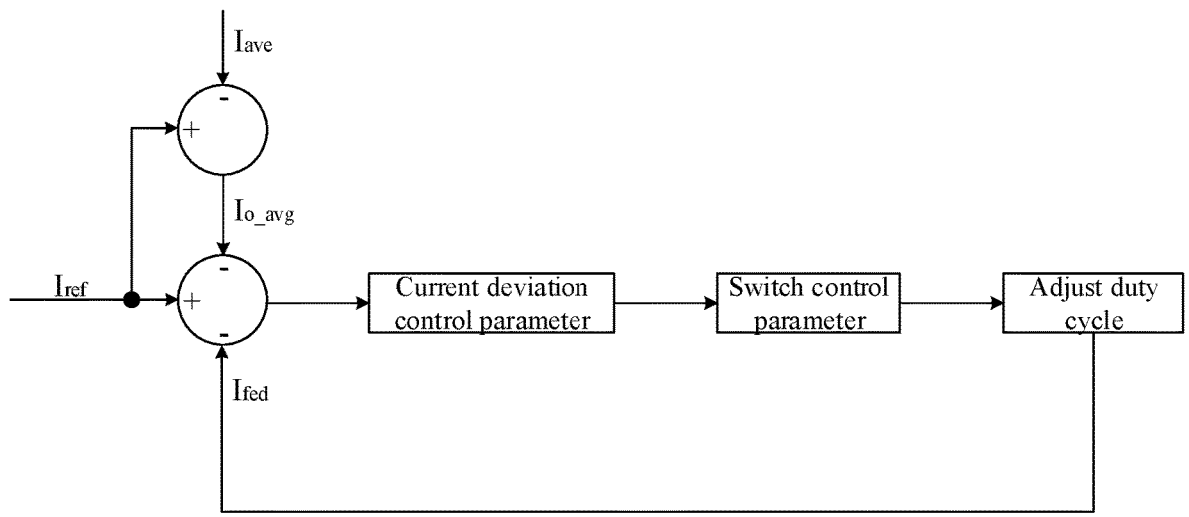
FIG. 15 illustrates a schematic diagram of another exemplary closed loop consistent with disclosed embodiments of the present disclosure.

In one embodiment, the average value of current flowing through the second power port 120 may be an average value of the currents flowing through the second power port 120 within a preset time period. Further, because the energy storage device 20 is connected to the second power port 120, the average value of current flowing through the second power port 120 may be regarded as an average value of current flowing through the energy storage device 20. In addition, because the compensation current value is the difference between the preset current value and the average value of current flowing through the second power port 120, the compensation current value may be understood as the difference between the expected charging (discharging) current value and the actual charging (discharging) current value. Therefore, the control circuit 170 may correct the current deviation control parameter according to the compensation current value, thereby improving the control accuracy. For example, referring to FIG. 15, the control circuit 170 may determine the compensation current value ($I_{o\_avg}$ in the Figure) according to the difference between the preset current value ($I_{ref}$ in the Figure) and the average value of current flowing through the second power port 120 ($I_{ave}$ in the Figure), may determine the current deviation control parameter according to $I_{ref}$, $I_{fed}$ and $I_{o\_avg}$, thereby improving the control accuracy.

Figure 16:
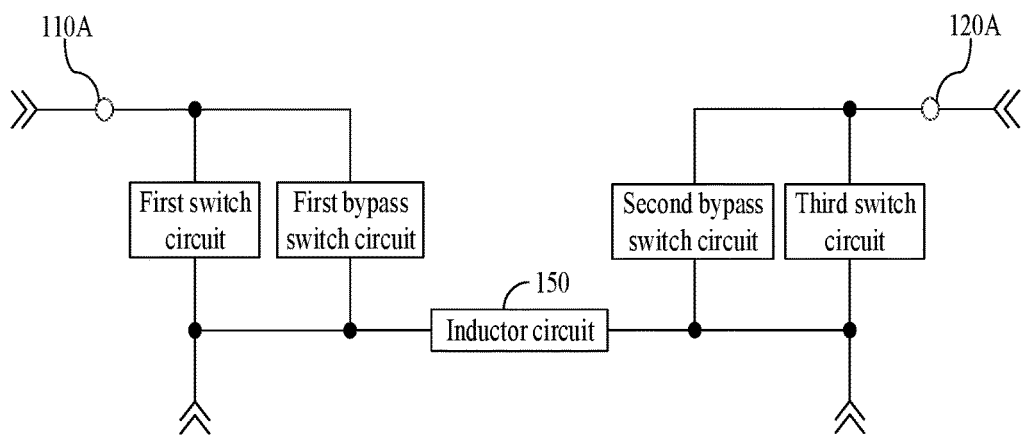
FIG. 16 illustrates a schematic diagram of a circuit structure of an exemplary bypass switch circuit consistent with disclosed embodiments of the present disclosure.

In one embodiment, to further reduce the power consumption of the bidirectional DC/DC converter 10, referring to FIG. 16, the first half-bridge circuit 130 may further include a first bypass switch circuit connected in parallel with the first switch circuit, and the second half-bridge circuit 140 may further include a second bypass switch circuit connected in parallel with the third switch circuit. An internal resistance of the first bypass switch circuit may be less than an internal resistance of the first switch circuit, and an internal resistance of the second bypass switch circuit may be less than an internal resistance of the third switch circuit. Therefore, the conduction loss of the first bypass switch may be less than the conduction loss of the first switch circuit, and similarly, the conduction loss of the second bypass switch circuit may be less than the conduction loss of the third switch circuit.

In view of this, in one embodiment, the control circuit 170 may be further configured to: when the first half-bridge circuit 130 is the target half-bridge circuit, control the first bypass switch circuit to be turned off and control the second bypass switch circuit to be turned on; and when the second half-bridge circuit 140 is the target half-bridge circuit, control the first bypass switch circuit to be turned on and control the second bypass switch to be turned off. Specifically, when the operating mode of the bidirectional DC/DC converter 10 is the step-down charging or the step-up discharging, the first half-bridge circuit 130 may be the target half-bridge circuit, and the control circuit 170 may control the first bypass switch circuit to be turned off and may control the second bypass switch circuit to be turned on. In view of this, the inductor circuit 150 may be connected to the anode 120A of the second power port 120 through the second bypass switch circuit. Similarly, when the operating mode of the bidirectional DC/DC converter 10 is the step-up charging or the step-down discharging, the second half-bridge circuit 140 may be the target half-bridge circuit, and the control circuit 170 may control the first bypass switch circuit to be turned on and may control the second bypass switch circuit to be turned off. In view of this, the inductor circuit 150 may be connected to the anode 110A of the first power port 110 through the first bypass switch circuit. Therefore, because the conduction loss of the bypass switch circuit is lower than the conduction loss of the switch circuit, the power consumption of the bidirectional DC/DC converter 10 may be further reduced, thereby further improving the reliability of the bidirectional DC/DC converter 10.

In one embodiment, each switch circuit may include one switch transistor or a plurality of switch transistors connected in parallel, therefore the control circuit 170 may further be configured to determine a quantity of turned-on switch transistors according to the charging power or the discharging power. In one embodiment, the first half-bridge circuit 130 may be the target half-bridge circuit, and the first switch circuit may be the target switch circuit. The first switch circuit may include three switch transistors connected in parallel, and each switch transistor may sustain a power of 1100 W. In view of this, if the charging power or discharging power is 3000 W, the control circuit 170 may determine that the quantity of turned-on switch transistors is three. If the charging power or discharging power is 1000 W, the control circuit 170 may determine that the quantity of turned-on switch transistors is one.

Figure 17:
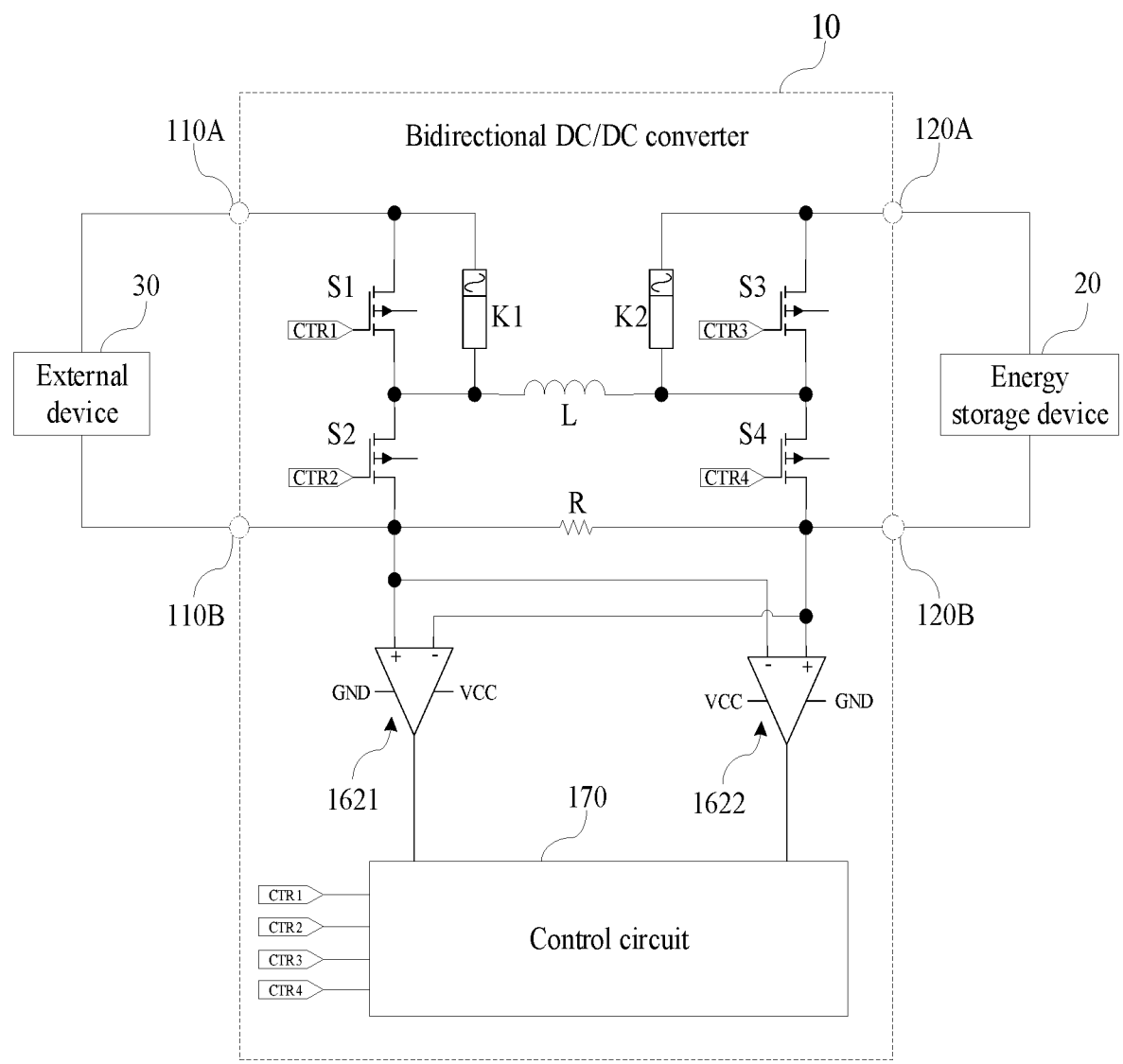
FIG. 17 illustrates a schematic diagram of a circuit structure of another exemplary bidirectional DC/DC converter consistent with disclosed embodiments of the present disclosure.

Accordingly, referring to FIG. 17, the bidirectional DC/DC converter 10 may be connected to the energy storage device 20 and the external device 30, respectively, and may be configured to perform the charging and discharging of the energy storage device 20. In one embodiment, in the bidirectional DC/DC converter 10 in the present disclosure, the first switch circuit may include a switch transistor S1, the second switch circuit may include a switch transistor S2, the third switch circuit may include a switch transistor S3, and the fourth switch circuit may include a switch transistor S4. The inductor circuit 150 may include an inductor L, the resistor circuit 161 may include a high-precision resistor R, the first bypass switch circuit may include a relay K1, and the second bypass switch circuit may include a relay K2. The control circuit 170 may be connected to control terminals of the switch transistor S1, the switch transistor S2, the switch transistor S3, and the switch transistor S4, respectively. The other components and connection relations may refer to the previous discussion and drawings for details, which may not be repeated herein.

In view of this, the control circuit 170 may be configured to: obtain an operating instruction; according to the operating instruction and a magnitude relationship between the voltage value of the first power port 110 and the voltage value of the second power port 120, determine the operating mode; according to the operating mode, determine one of the half-bridge circuits as the target half-bridge circuit, and determine one of the switch circuits in the target half-bridge circuit as the target switch circuit and another one of the switch circuits in the target half-bridge circuit as the freewheeling switch circuit; turn on the bypass switch circuit in the target half-bridge circuit, and turn off the bypass switch circuit in another half-bridge circuit; control the target switch circuit in the target half-bridge circuit to be turned on and off periodically; control the freewheeling switch circuit to be turned off when the target switch circuit is turned on, and control the freewheeling switch circuit to be turned on when the target switch circuit is turned off; and control the freewheeling switch circuit to be turned off when the amplitude of the current flowing through the inductor circuit 150 is less than or equal to the preset threshold value.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:

1. A bidirectional DC/DC converter, comprising:
 a first half-bridge circuit, including two switch circuits connected in series and configured to be connected to a first power port, wherein the first power port is configured to be connected to a direct current bus;
a second half-bridge circuit, including two switch circuits connected in series and configured to be connected to a second power port, wherein the second power port is configured to be connected to an energy storage device;
an inductor circuit, wherein one end of the inductor circuit is connected to a connection point of the two switch circuits in the first half-bridge circuit, another end of the inductor circuit is connected to a connection point of the two switch circuits in the second half-bridge circuit, and the first half-bridge circuit and the second half-bridge circuit form a H-bridge loop through the inductor circuit;
an inductor current detection circuit, configured to collect an amplitude of a current flowing through the inductor circuit; and
a control circuit, connected to the two switch circuits in the first half-bridge circuit, the two switch circuits in the second half-bridge circuit, and the inductor current detection circuit, respectively, wherein the control circuit is configured to:
determine an operating mode of the bidirectional DC/DC converter,
according to the operating mode, determine one of the first and second half-bridge circuits as a target half-bridge circuit, and determine one of the two switch circuits in the target half-bridge circuit as a target switch circuit, and another one of the two switch circuits in the target half-bridge circuit as a freewheeling switch circuit,
control the target switch circuit to be turned on and off periodically,
control the freewheeling switch circuit to be turned off when the target switch circuit is turned on,
control the freewheeling switch circuit to be turned on when the target switch circuit is turned off, and
when the amplitude of the current flowing through the inductor circuit is less than or equal to a preset threshold value, determine that energy stored in the inductor circuit is fully released, and control the freewheeling switch circuit to be turned off.

2. The bidirectional DC/DC converter according to claim 1, wherein:
the inductor current detection circuit includes a resistor circuit and a sampling circuit, wherein:
the resistor circuit is configured on the H-bridge loop, and the sampling circuit connects to the resistor circuit and the control circuit, and
the control circuit uses the sampling circuit to obtain an amplitude of a current flowing through the resistor circuit, and then determines the amplitude of the current flowing through the inductor circuit.

3. The bidirectional DC/DC converter according to claim 2, wherein:
the sampling circuit includes a first differential circuit and a second differential circuit, wherein:
a positive input terminal of the first differential circuit is connected to a first terminal of the resistor circuit, a negative input terminal of the first differential circuit is connected to a second terminal of the resistor circuit, and a signal output terminal of the first differential circuit is connected to the control circuit,
a positive input terminal of the second differential circuit is connected to the second terminal of the resistor circuit, a negative input terminal of the second differential circuit is connected to the first terminal of the resistor circuit, and a signal output terminal of the second differential circuit is connected to the control circuit,
when the current flowing through the resistor circuit flows from the first terminal to the second terminal, the control circuit uses the first differential circuit to determine the amplitude of the current flowing through the inductor circuit, and
when the current flowing through the resistor circuit flows from the second terminal to the first terminal, the control circuit uses the second differential circuit to determine the amplitude of the current flowing through the inductor circuit through.

4. The bidirectional DC/DC converter according to claim 1, wherein the control circuit is configured to determine the operating mode of the bidirectional DC/DC converter by performing:
obtaining an operating instruction, and
according to the operating instruction and a magnitude relationship between a voltage value of the first power port and a voltage value of the second power port, determining the operating mode, wherein the operating mode includes step-up charging, step-up discharging, step-down charging, and step-down discharging.

5. The bidirectional DC/DC converter according to claim 4, wherein:
the first half-bridge circuit includes a first switch circuit and a second switch circuit that are connected in series, and the second half-bridge circuit includes a third switch circuit and a fourth switch circuit that are connected in series; and
the first switch circuit serves as an upper bridge arm of the first half-bridge circuit, the third switch circuit serves as an upper bridge arm of the second half-bridge circuit, the second switch circuit serves as a lower bridge arm of the first half-bridge circuit, and the fourth switch circuit serves as a lower bridge arm of the second half-bridge circuit.

6. The bidirectional DC/DC converter according to claim 5, wherein
according to the operating mode, the control circuit is configured to determine one of the first and second half-bridge circuits as the target half-bridge circuit, and determine one of the two switch circuits in the target half-bridge circuit as the target switch circuit, and another one of the two switch circuits in the target half-bridge circuit as the freewheeling switch circuit by performing:
when the operating mode is the step-down charging, determining that the first half-bridge circuit is the target half-bridge circuit, the first switch circuit is the target switch circuit and the second switch circuit is the freewheeling switch circuit,
when the operating mode is the step-up charging, determining that the second half-bridge circuit is the target half-bridge circuit, the fourth switch circuit is the target switch circuit and the third switch circuit is the freewheeling switch circuit,
when the operating mode is the step-up discharging, determining that the first half-bridge circuit is the target half-bridge circuit, the second switch circuit is the target switch circuit and the first switch circuit is the freewheeling switch circuit, and
when the operating mode is the step-down discharging, determining that the second half-bridge circuit is the target half-bridge circuit, the third switch circuit is the target switch circuit and the fourth switch circuit is the freewheeling switch circuit.

7. The bidirectional DC/DC converter according to claim 6, wherein:
the first half-bridge circuit further includes a first bypass switch circuit connected in parallel with the first switch circuit, and the second half-bridge circuit further includes a second bypass switch circuit connected in parallel with the third switch circuit; and
an internal resistance of the first bypass switch circuit is less than an internal resistance of the first switch circuit, and an internal resistance of the second bypass switch circuit is less than an internal resistance of the third switch circuit.

8. The bidirectional DC/DC converter according to claim 7, wherein the control circuit is further configured to:
when the first half-bridge circuit is the target half-bridge circuit, control the first bypass switch circuit to be turned off and the second bypass switch circuit to be turned on; and
when the second half-bridge circuit is the target half-bridge circuit, control the first bypass switch circuit to be turned on and the second bypass switch to be turned off.

9. The bidirectional DC/DC converter according to claim 7, wherein:
each of the first bypass switch circuit and the second bypass switch circuit includes a relay.

10. The bidirectional DC/DC converter according to claim 1, wherein the control circuit is further configured to:
determine a duty cycle of the target switch circuit according to a switch control parameter, wherein the switch control parameter includes a current deviation control parameter, and the current deviation control parameter corresponds to a difference between a preset current value in the operating mode and the amplitude of the current flowing through the inductor circuit.

11. The bidirectional DC/DC converter according to claim 10, wherein the control circuit is further configured to:
correct the current deviation control parameter according to a compensation current value, wherein the compensation current value is a difference value between the preset current value and an average value of current flowing through the second power port.

12. The bidirectional DC/DC converter according to claim 1, wherein:
each switch circuit includes one switch transistor or a plurality of switch transistors connected in parallel, and
the control circuit is further configured to determine a quantity of turned-on switch transistors of the plurality of switch transistors according to a charging power or a discharging power.

13. The bidirectional DC/DC converter according to claim 12, wherein:
the switch transistor includes a MOS transistor.

14. The bidirectional DC/DC converter according to claim 12, wherein:
the control circuit is configured to use a pulse-width modulation control signal to drive the target switch circuit to be turned on and off periodically.

15. A bidirectional DC/DC converter, comprising:
a first half-bridge circuit, including two switch circuits connected in series and configured to be connected to a first power port, wherein the first power port is configured to be connected to a direct current bus;
a second half-bridge circuit, including two switch circuits connected in series and configured to be connected to a second power port, wherein the second power port is configured to be connected to an energy storage device, and each switch circuit includes one switch transistor or a plurality of switch transistors connected in parallel;
an inductor circuit, wherein one end of the inductor circuit is connected to a connection point of the two switch circuits in the first half-bridge circuit, another end of the inductor circuit is connected to a connection point of the two switch circuits in the second half-bridge circuit, and the first half-bridge circuit and the second half-bridge circuit form a H-bridge loop through the inductor circuit;
an inductor current detection circuit, configured to collect an amplitude of a current flowing through the inductor circuit; and
a control circuit, connected to the two switch circuits in the first half-bridge circuit, the two switch circuits in the second half-bridge circuit, and the inductor current detection circuit, respectively, wherein the control circuit is configured to:
determine an operating mode of the bidirectional DC/DC converter,
according to the operating mode, determine one of the first and second half-bridge circuits as a target half-bridge circuit, and determine one of the two switch circuits in the target half-bridge circuit as a target switch circuit, and another one of the two switch circuits in the target half-bridge circuit as a freewheeling switch circuit,
control the target switch circuit to be turned on and off periodically,
control the freewheeling switch circuit to be turned off when the target switch circuit is turned on,
control the freewheeling switch circuit to be turned on when the target switch circuit is turned off,
when the amplitude of the current flowing through the inductor circuit is less than or equal to a preset threshold value, determine that energy stored in the inductor circuit is fully released, and control the freewheeling switch circuit to be turned off,
determine a duty cycle of the target switch circuit according to a switch control parameter, wherein the switch control parameter includes a current deviation control parameter, the switch control parameter varies with the current deviation control parameter, and the current deviation control parameter corresponds to a difference between a preset current value in the operating mode and the amplitude of the current flowing through the inductor circuit, and
correct the current deviation control parameter according to a compensation current value to improve control accuracy, wherein the compensation current value is a difference value between the preset current value and an average value of current flowing through the second power port.

16. An energy storage system, comprising:
a bidirectional DC/DC converter, and an energy storage device connected to a second power port of the bidirectional DC/DC converter, the bidirectional DC/DC converter including:
a first half-bridge circuit, including two switch circuits connected in series and configured to be connected to a first power port, wherein the first power port is configured to be connected to a direct current bus;
a second half-bridge circuit, including two switch circuits connected in series and configured to be connected to the second power port, wherein the second power port is configured to be connected to the energy storage device;

an inductor circuit, wherein one end of the inductor circuit is connected to a connection point of the two switch circuits in the first half-bridge circuit, another end of the inductor circuit is connected to a connection point of the two switch circuits in the second half-bridge circuit, and the first half-bridge circuit and the second half-bridge circuit form a H-bridge loop through the inductor circuit;

an inductor current detection circuit, configured to collect an amplitude of a current flowing through the inductor circuit; and a control circuit, connected to the two switch circuits in the first half-bridge circuit, the two switch circuits in the second half-bridge circuit, and the inductor current detection circuit, respectively, wherein the control circuit is configured to:

determine an operating mode of the bidirectional DC/DC converter, according to the operating mode, determine one of the first and second half-bridge circuits as a target half-bridge circuit, and determine one of the two switch circuits in the target half-bridge circuit as a target switch circuit, and another one of the two switch circuits in the target half-bridge circuit as a freewheeling switch circuit, control the target switch circuit to be turned on and off periodically, control the freewheeling switch circuit to be turned off when the target switch circuit is turned on, control the freewheeling switch circuit to be turned on when the target switch circuit is turned off, and when the amplitude of the current flowing through the inductor circuit is less than or equal to a preset threshold value, determine that energy stored in the inductor circuit is fully released, and control the freewheeling switch circuit to be turned off.

17. The energy storage system according to claim 16, wherein:

the inductor current detection circuit includes a resistor circuit and a sampling circuit, wherein:

the resistor circuit is configured on the H-bridge loop, and the sampling circuit connects to the resistor circuit and the control circuit, and the control circuit uses the sampling circuit to obtain an amplitude of a current flowing through the resistor circuit, and then determine the amplitude of the current flowing through the inductor circuit.

18. The energy storage system according to claim 16, wherein the control circuit is configured to determine the operating mode of the bidirectional DC/DC converter by performing:

obtaining an operating instruction, and according to the operating instruction and a magnitude relationship between a voltage value of the first power port and a voltage value of the second power port, determining the operating mode, wherein the operating mode includes step-up charging, step-up discharging, step-down charging, and step-down discharging.

19. The energy storage system according to claim 18, wherein:

the first half-bridge circuit includes a first switch circuit and a second switch circuit that are connected in series, and the second half-bridge circuit includes a third switch circuit and a fourth switch circuit that are connected in series.

20. The energy storage system according to claim 19, wherein according to the operating mode, the control circuit is configured to determine one of the first and second half-bridge circuits as the target half-bridge circuit, and determine one of the two switch circuits in the target half-bridge circuit as the target switch circuit, and another one of the two switch circuits in the target half-bridge circuit as the freewheeling switch circuit by performing:

when the operating mode is the step-down charging, determining that the first half-bridge circuit is the target half-bridge circuit, the first switch circuit is the target switch circuit and the second switch circuit is the freewheeling switch circuit, when the operating mode is the step-up charging, determining that the second half-bridge circuit is the target half-bridge circuit, the fourth switch circuit is the target switch circuit and the third switch circuit is the freewheeling switch circuit, when the operating mode is the step-up discharging, determining that the first half-bridge circuit is the target half-bridge circuit, the second switch circuit is the target switch circuit and the first switch circuit is the freewheeling switch circuit, and when the operating mode is the step-down discharging, determining that the second half-bridge circuit is the target half-bridge circuit, the third switch circuit is the target switch circuit and the fourth switch circuit is the freewheeling switch circuit.

\* \* \* \* \*